(12) United States Patent
Pedersen et al.

(10) Patent No.: US 10,581,531 B2
(45) Date of Patent: Mar. 3, 2020

(54) SYSTEM FOR MAKING MOTION PICTURES UNDER WATER

(71) Applicants: Stig M. Pedersen, Los Angeles, CA (US); Jon L. Vavrus, Claremont, CA (US); Nicholas M. Pedersen, Los Angeles, CA (US)

(72) Inventors: Stig M. Pedersen, Los Angeles, CA (US); Jon L. Vavrus, Claremont, CA (US); Nicholas M. Pedersen, Los Angeles, CA (US)

(73) Assignee: Zonaar Corporation, Los Angeles, CA (US)

( * ) Notice: Subject to any disclaimer, the term of this patent is extended or adjusted under 35 U.S.C. 154(b) by 404 days.

(21) Appl. No.: 15/731,028

(22) Filed: Apr. 7, 2017

(65) Prior Publication Data
US 2018/0294893 A1    Oct. 11, 2018

Related U.S. Application Data

(63) Continuation-in-part of application No. 13/999,759, filed on Mar. 18, 2014, now Pat. No. 9,668,041.

(60) Provisional application No. 61/855,725, filed on May 22, 2013.

(51) Int. Cl.
*H04B 11/00* (2006.01)
*H04R 1/44* (2006.01)
*H04N 7/18* (2006.01)
*H04N 5/77* (2006.01)
(Continued)

(52) U.S. Cl.
CPC ............. *H04B 11/00* (2013.01); *H04B 13/02* (2013.01); *H04N 5/77* (2013.01); *H04N 7/185* (2013.01); *H04R 1/44* (2013.01); *H04R 5/033* (2013.01); *H04R 2420/07* (2013.01); *H04R 2499/11* (2013.01)

(58) Field of Classification Search
CPC .......... H04B 11/00; H04B 13/02; H04N 5/77; H04N 7/185; H04R 5/033; H04R 2420/07; H04R 1/44; H04R 2499/11
See application file for complete search history.

(56) References Cited

U.S. PATENT DOCUMENTS

| | | |
|---|---|---|
| 4,039,999 A | 8/1977 | Weston |
| 4,065,747 A | 12/1977 | Patten |
| 4,147,222 A | 4/1979 | Patten |

(Continued)

OTHER PUBLICATIONS

Swimovate's Poolmate Printed from website No date or city of publication known.

(Continued)

*Primary Examiner* — Daniel Pihulic
(74) *Attorney, Agent, or Firm* — Thomas Nello Giaccherini

(57) ABSTRACT

In one embodiment of the invention, a crew member (172) using a computing device (174) communicates over a wireless link (15) with a film system communication module (176) placed nearby a filming tank (178). The computing device (174) can be a smartphone, tablet or computer. A crew member (180) and/or talent (182) wearing a remote transceiver (184) in the tank communicates over a wireless link (58) through the film system communication module. Additional crew members (186) can also connect to the film system communication module (176) and communicate to any person with a transceiver (184).

15 Claims, 33 Drawing Sheets

(51) Int. Cl.
    *H04B 13/02*    (2006.01)
    *H04R 5/033*    (2006.01)

(56) References Cited

U.S. PATENT DOCUMENTS

| | | |
|---|---|---|
| 5,412,620 A | 5/1995 | Cafarella |
| 5,523,982 A | 6/1996 | Dale |
| 6,392,960 B1 | 5/2002 | Seltzer |
| 6,950,681 B2 | 9/2005 | Hoffman |
| 6,980,487 B2 | 12/2005 | Davies |
| 7,006,407 B2 | 2/2006 | Davies |
| 7,301,474 B2 | 11/2007 | Zimmerman |
| 7,391,317 B2 | 6/2008 | Abraham |
| 7,505,365 B2 | 3/2009 | Chryssostomidis |
| 7,505,367 B2 | 3/2009 | Abdi |
| 7,613,225 B1 | 11/2009 | Haque |
| 7,711,322 B2 | 5/2010 | Rhodes |
| 7,796,943 B2 | 9/2010 | Levan |
| 7,853,206 B2 | 12/2010 | Rhodes |
| 7,873,316 B2 | 1/2011 | Rhodes |
| 7,877,059 B2 | 1/2011 | Rhodes |
| 8,045,919 B2 | 10/2011 | Rhodes |
| 8,159,903 B2 | 4/2012 | Skrobanek |
| 8,241,184 B2 | 8/2012 | Dibenedetto |
| 9,668,041 B2 * | 5/2017 | Vavrus ................ H04R 1/1091 |
| 2003/0208113 A1 * | 11/2003 | Mault ................ A61B 5/14532 600/316 |
| 2012/0039482 A1 * | 2/2012 | Walsh .................... A63B 33/00 381/74 |
| 2013/0214998 A1 * | 8/2013 | Andes ................. G02B 27/017 345/8 |
| 2014/0308042 A1 * | 10/2014 | Woo ....................... H04B 13/02 398/104 |
| 2014/0348367 A1 * | 11/2014 | Vavrus ................ H04R 1/1091 381/334 |
| 2017/0103440 A1 * | 4/2017 | Xing ...................... H04W 4/90 |
| 2018/0294893 A1 * | 10/2018 | Pedersen ................ H04B 11/00 |

OTHER PUBLICATIONS

Finis Swimsense Printed from webstie No date or city of publication known.
Instabeat Printed from webstie No date or city of publication known.
Swimovate's Poolmate Printed from website Publication date: Apr. 6, 2017 or earlier.
Finis Swimsense Printed from webstie Publication date: Apr. 6, 2017 or earlier.
Instabeat Printed from webstie Pubication date: Apr. 6, 2017 or earlier.

* cited by examiner

Magnetic Flux During Laps in Pool - Pool Frame

158
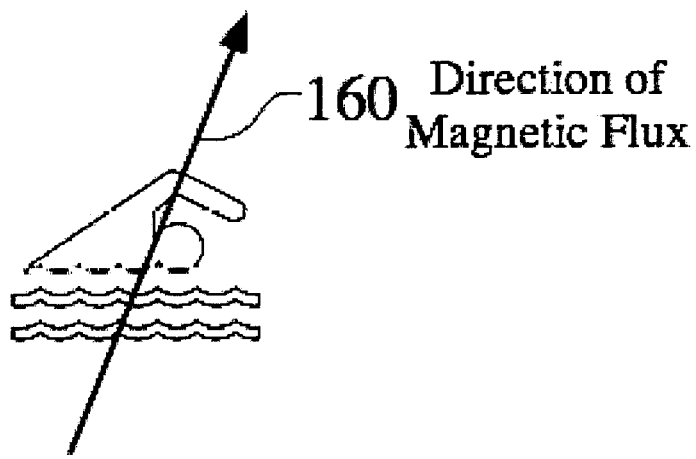
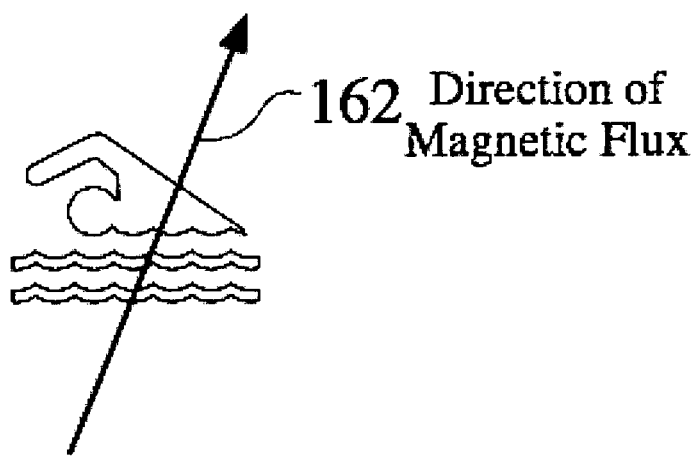
Magnetic Flux During
Laps in Pool - Body Frame
Fig. 21

Sensor Frame - Y is Pointing Perpendicular to the page away from the Viewer

Gravity and Magnetic Flux Vectors When Traveling on Forward Lap

Gravity and Magnetic Flux Vectors When Traveling on Reverse Lap

SYSTEM FOR MAKING MOTION PICTURES UNDER WATER

CROSS-REFERENCE TO RELATED PENDING PATENT APPLICATIONS & CLAIMS FOR PRIORITY

The Present CIP Patent Application is based on Provisional U.S. Patent Application No. 61/855,725, filed on 22 May 2013, which is now abandoned; and on Pending U.S. patent application Ser. No. 13,999,759, filed on 18 Mar. 2014.

In accordance with the provisions of Sections 119 and/or 120 of Title 35 of the United States Code of Laws, the Inventors claim the benefit of priority for any and all subject matter which is commonly disclosed in the Present Non-Provisional Patent Application, or in Provisional Patent Application U.S. Ser. No. 61/855,725 or in Pending patent application U.S. Ser. No. 13,999,759.

FIELD OF THE INVENTION

One embodiment of the present invention comprises a system for making motion pictures under water. In one particular embodiment of the invention, a motion picture crew member using a computing device communicates over a wireless link with a film system communication module placed nearby a filming tank. The computing device may be a smartphone, tablet or computer. A crew member and/or talent wearing a remote transceiver in the tank communicates over a wireless link through the film system communication module. Additional crew members can also connect to the film system communication module and communicate to any person with a transceiver. In an alternative embodiment of the invention, the wearer of the transceiver may be in different filming environments.

FEDERALLY SPONSORED RESEARCH OR DEVELOPMENT

None.

BACKGROUND OF THE INVENTION

Conventional methods for producing a motion picture are difficult to implement under water.

The development of a system that would provide enhanced methods of producing motion pictures would constitute a major technological advance, and would satisfy long-felt needs in the motion picture industry.

SUMMARY OF THE INVENTION

One embodiment of the present invention comprises a system for making motion pictures under water. In one particular embodiment of the invention, a motion picture crew member using a computing device communicates over a wireless link with a film system communication module placed nearby a filming tank. The computing device may be a smartphone, tablet or computer. A crew member and/or talent wearing a remote transceiver in the tank communicates over a wireless link through the film system communication module. Additional crew members can also connect to the film system communication module and communicate to any person with a transceiver. In an alternative embodiment of the invention, the wearer of the transceiver may be in different filming environments.

An appreciation of the other aims and objectives of the present invention, and a more complete and comprehensive understanding of this invention, may be obtained by studying the following description of a preferred embodiment, and by referring to the accompanying drawings.

A BRIEF DESCRIPTION OF THE DRAWINGS

Figure 4:
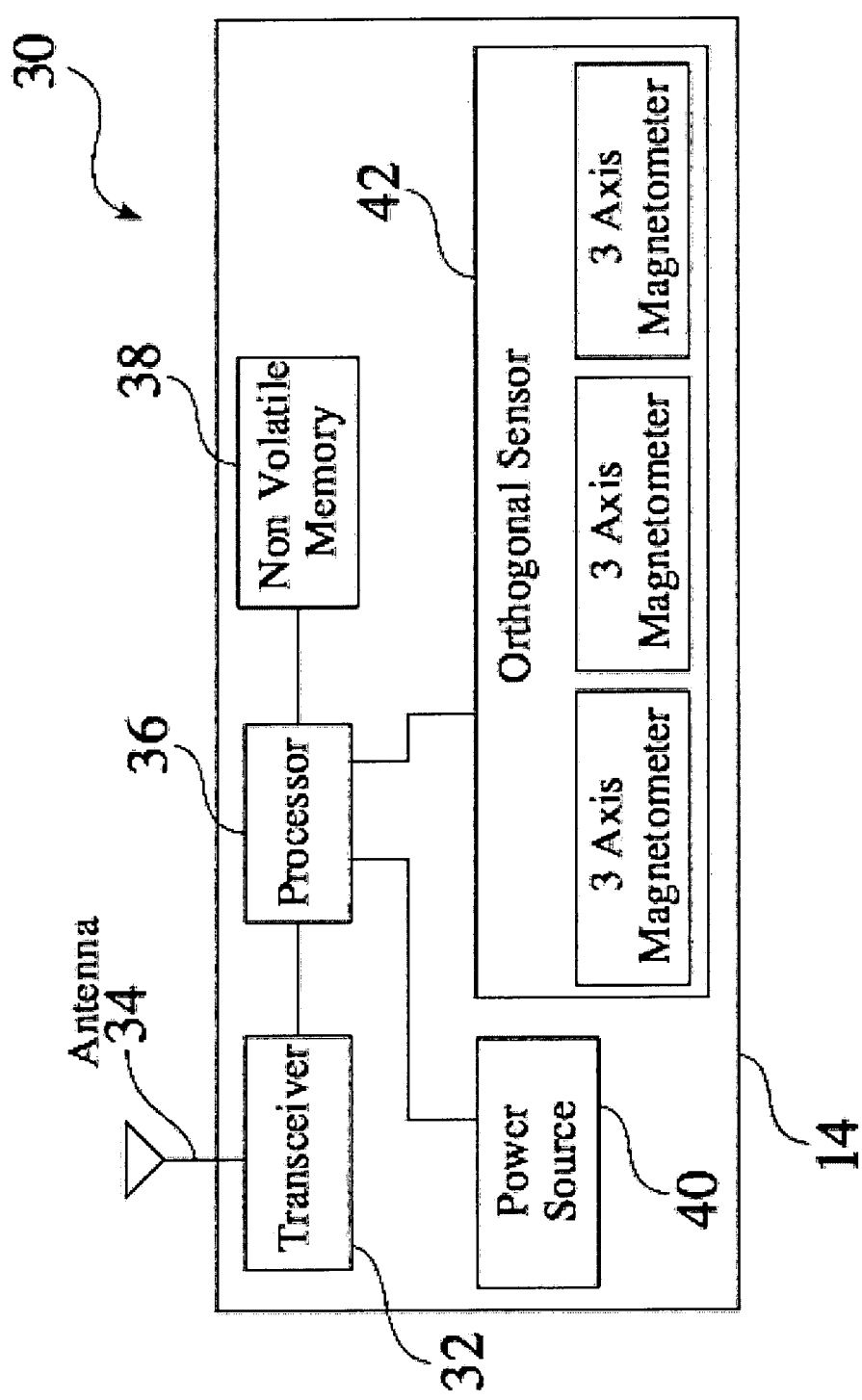

FIG. 4 provides a schematic block diagram of circuitry that is included in one embodiment of the headset.

Figure 5:
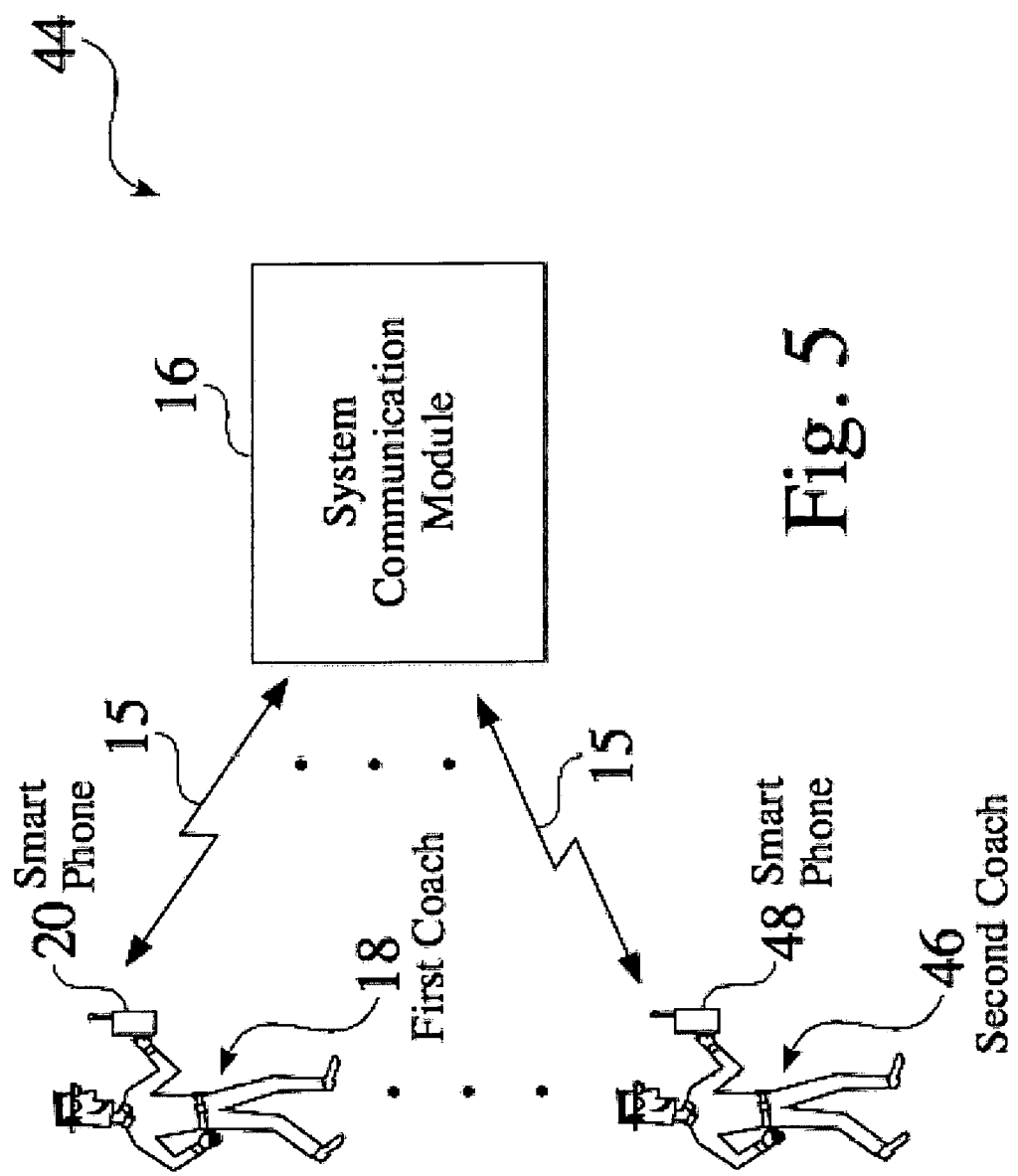

FIG. 5 supplies a schematic diagram which shows the system communication module providing links to multiple users.

Figure 6:
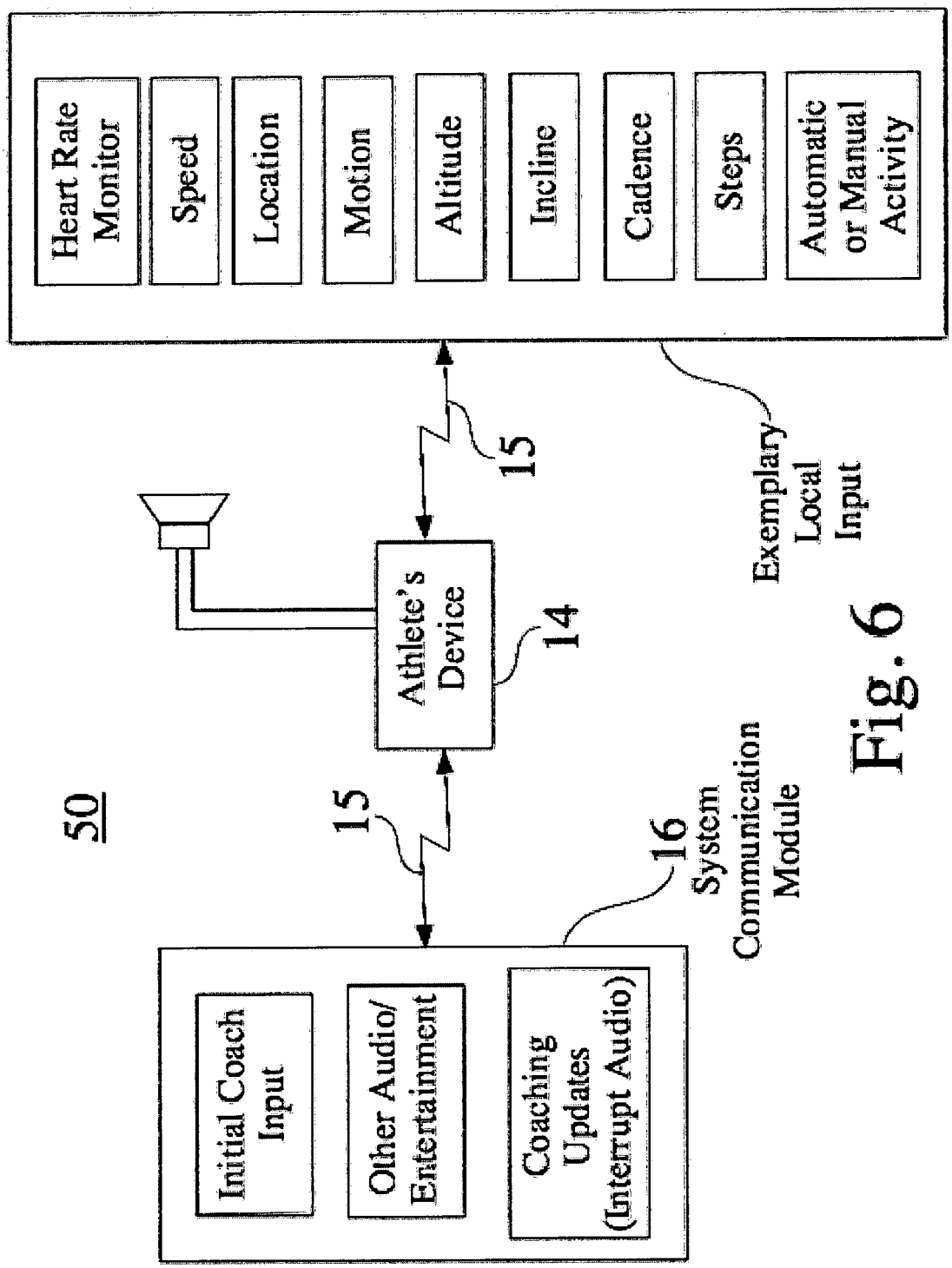

FIG. 6 presents a more detailed schematic block diagram of the system communication module, as well as a schematic block diagram of the athlete's device.

Figure 7:
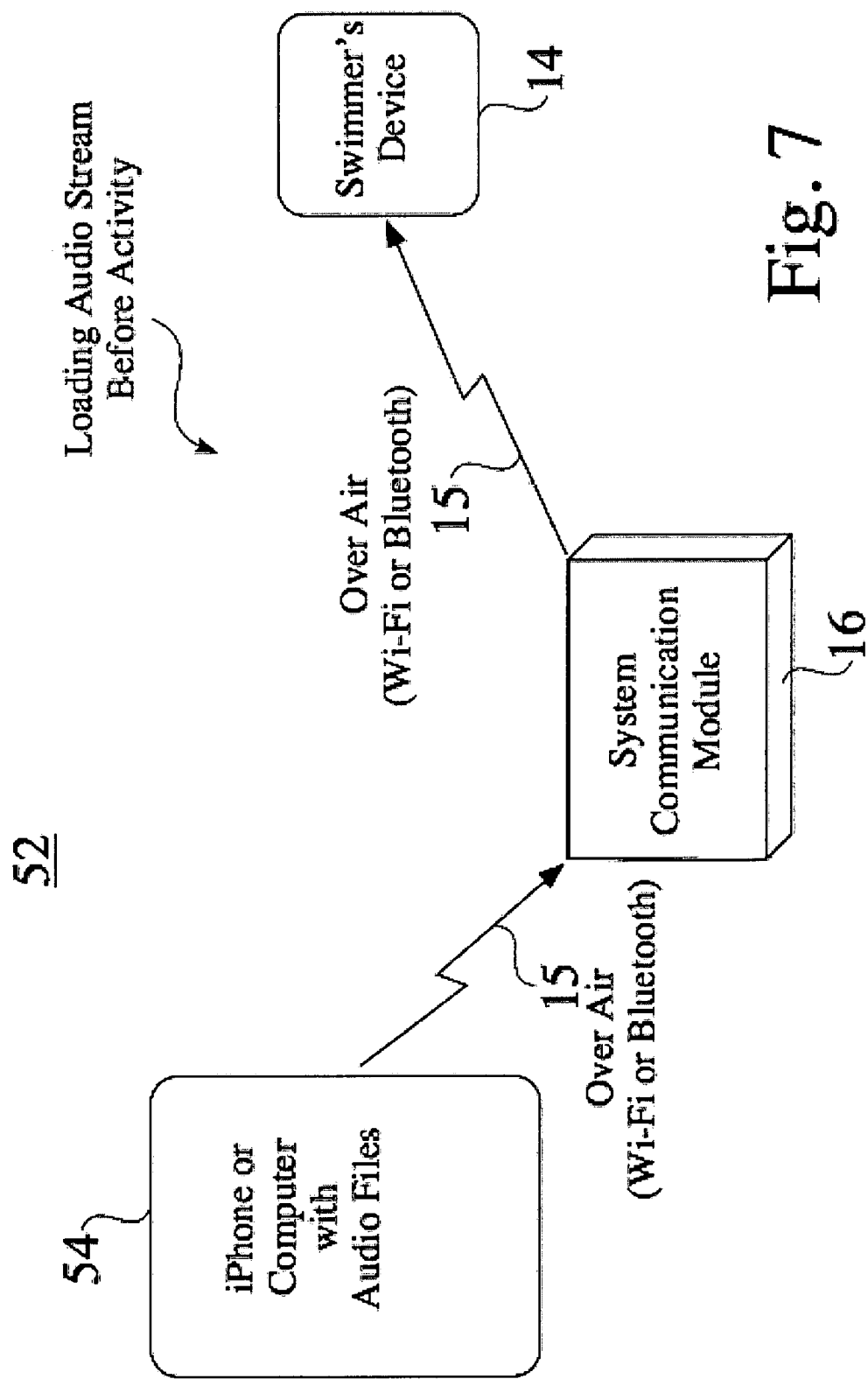

FIG. 7 shows how the system communication module provides wireless links to an iPhone or computer and/or a swimmer's device.

Figure 8:
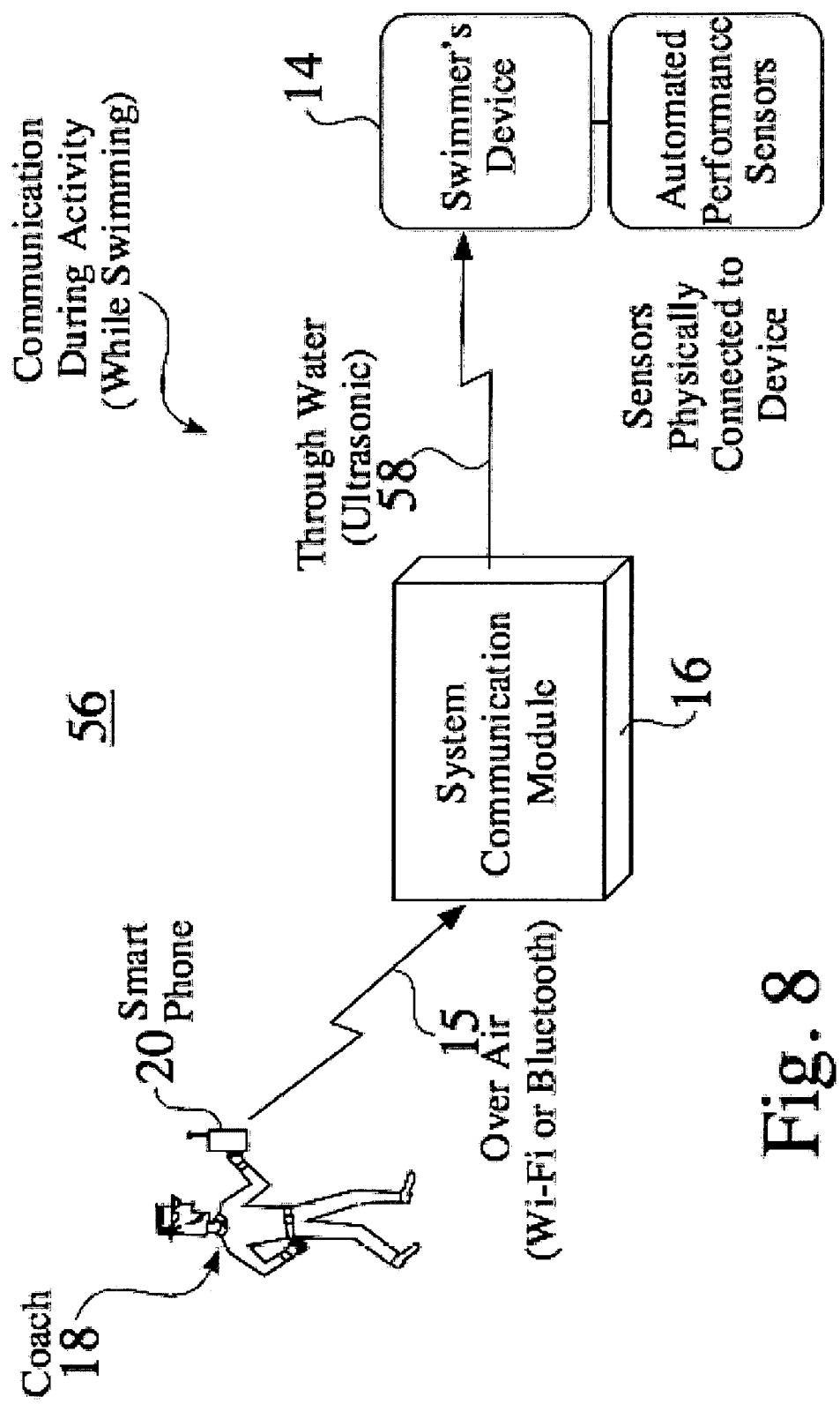

FIG. 8 shows the addition of performance sensors to the system shown in FIG. 7.

Figure 9:
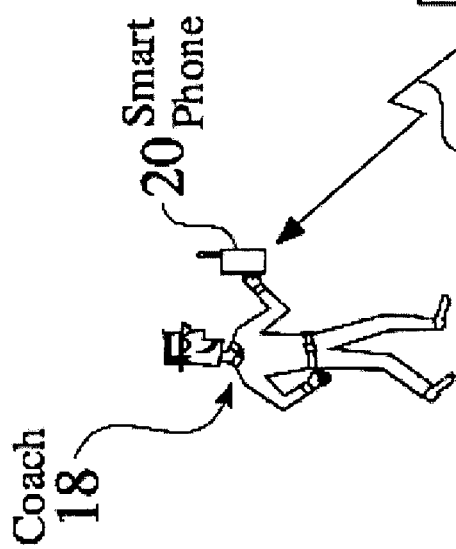
Figure 10:
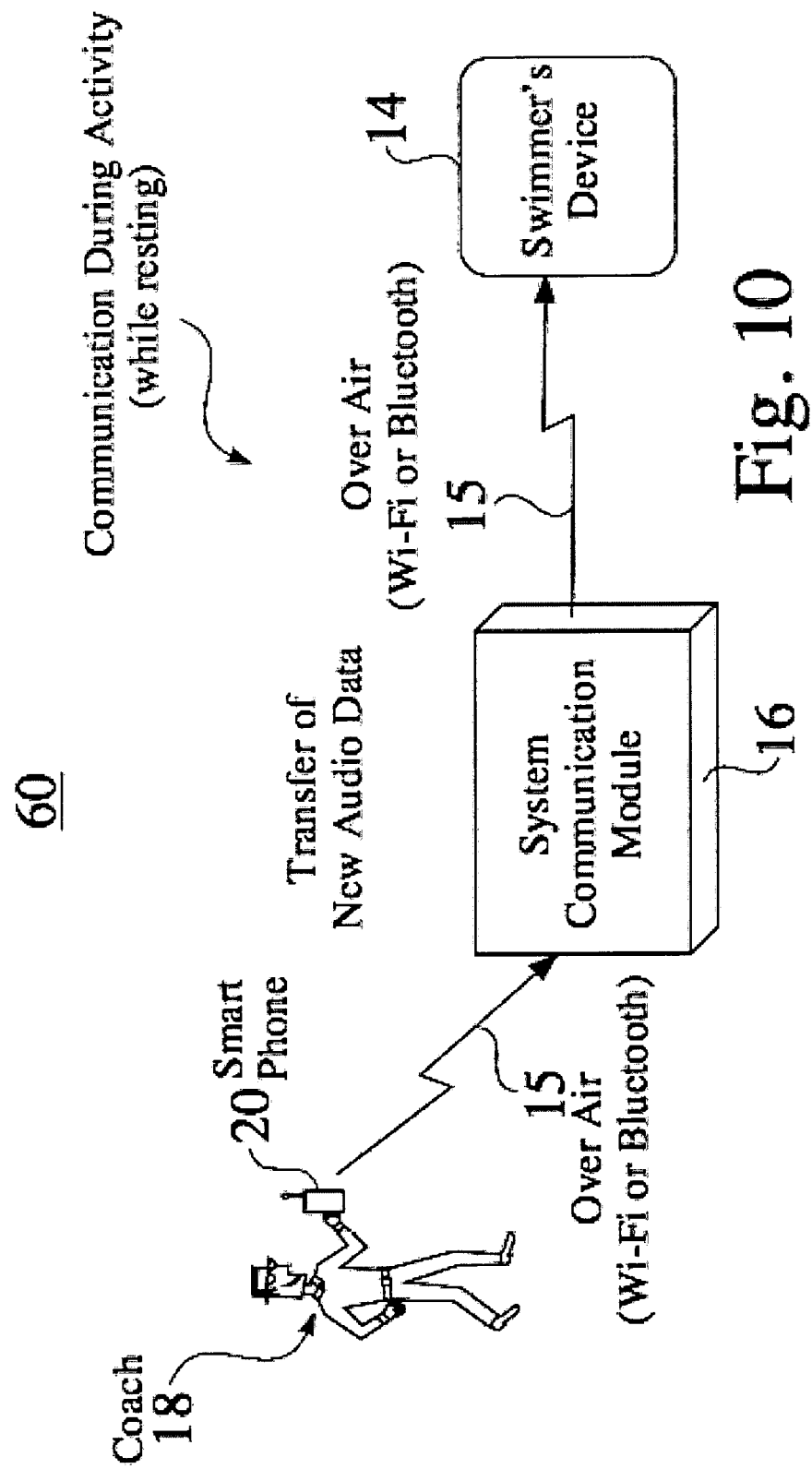

FIGS. 9 and 10 supply additional views of the wireless network created by the system communication module.

Figure 11:
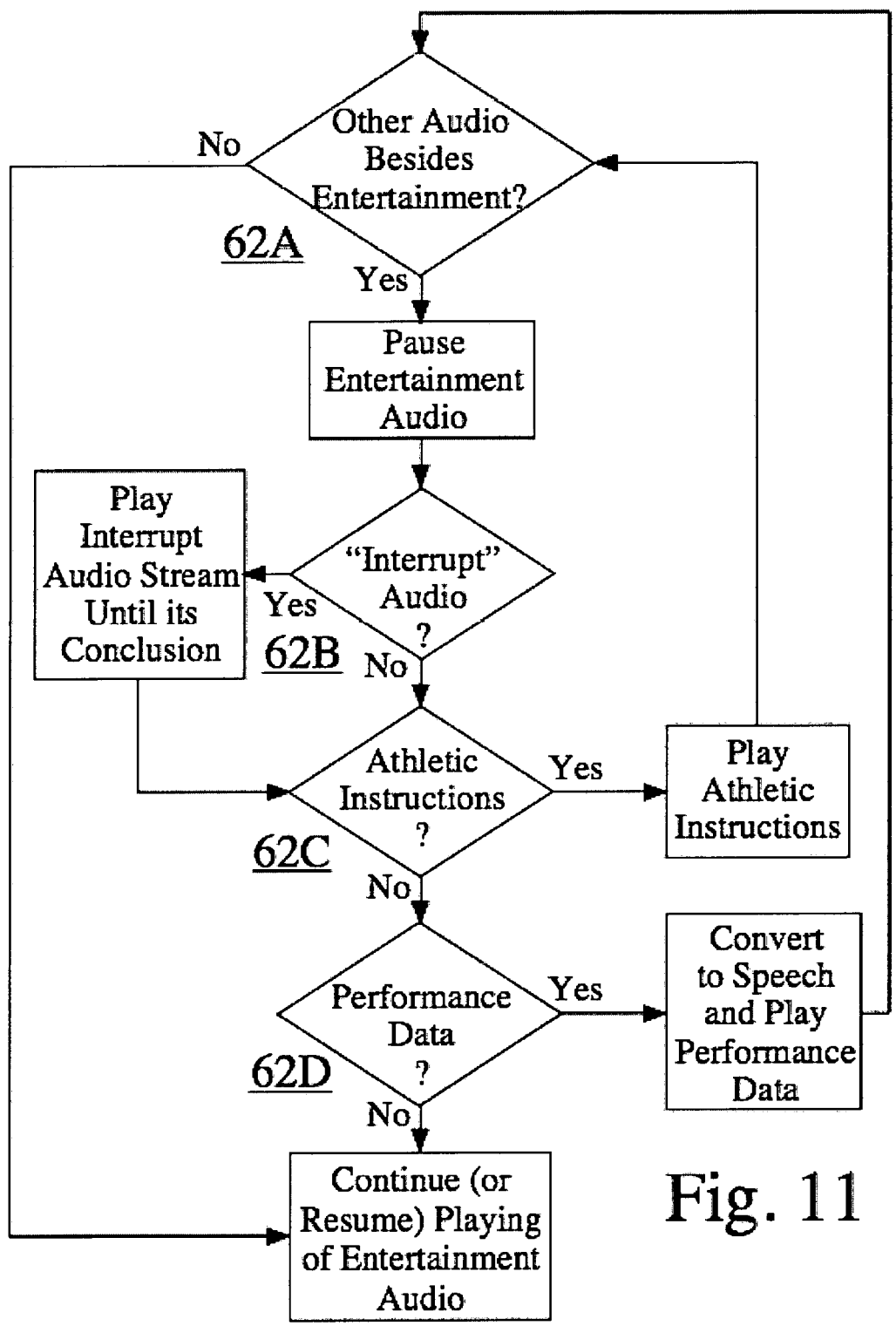

FIG. 11 is a flowchart that illustrates one embodiment of the present invention.

Figure 12:
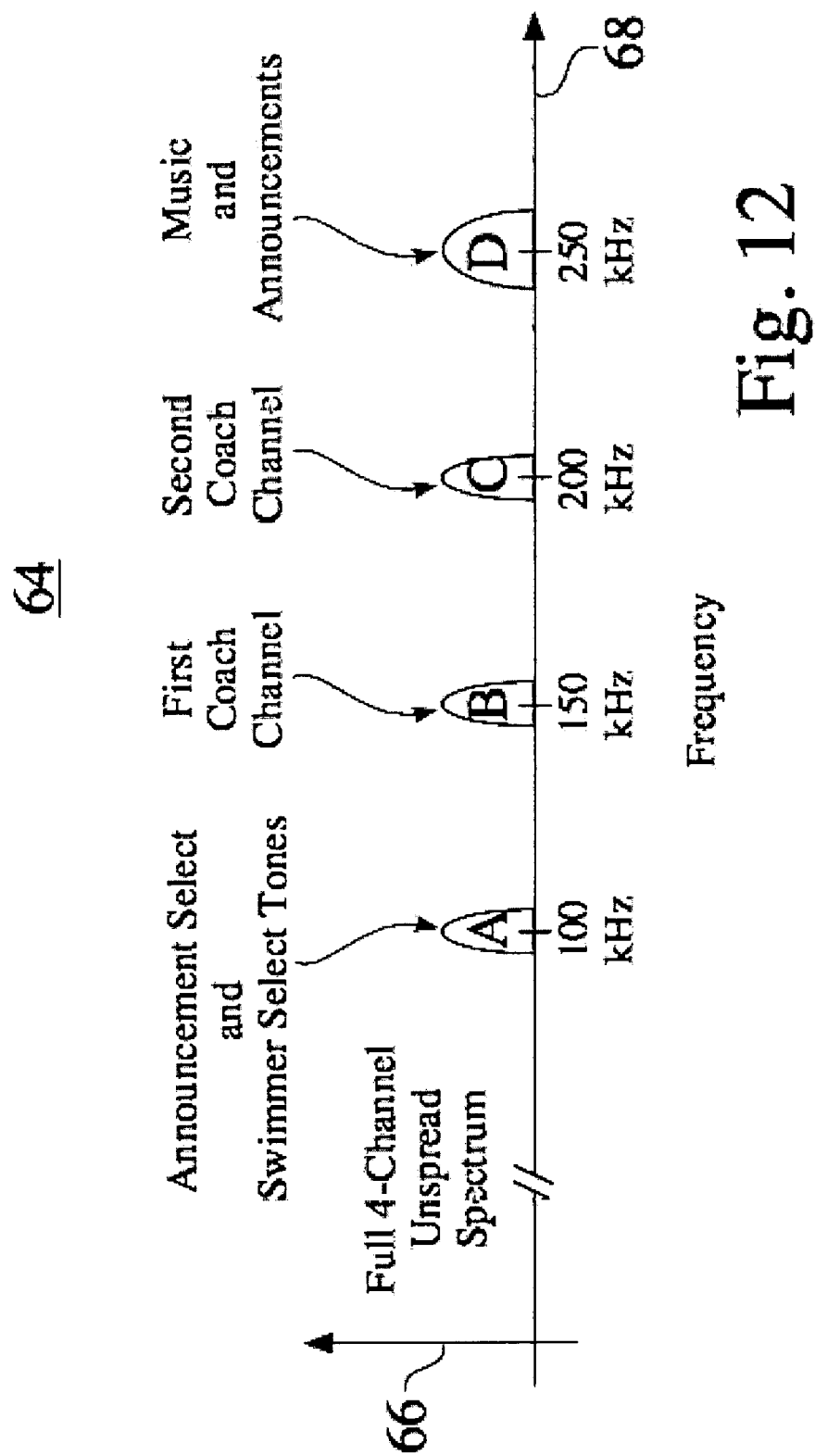

FIG. 12 portrays the spectrum that is used for wireless multi-stream communications in one particular embodiment of the invention.

Figure 13:
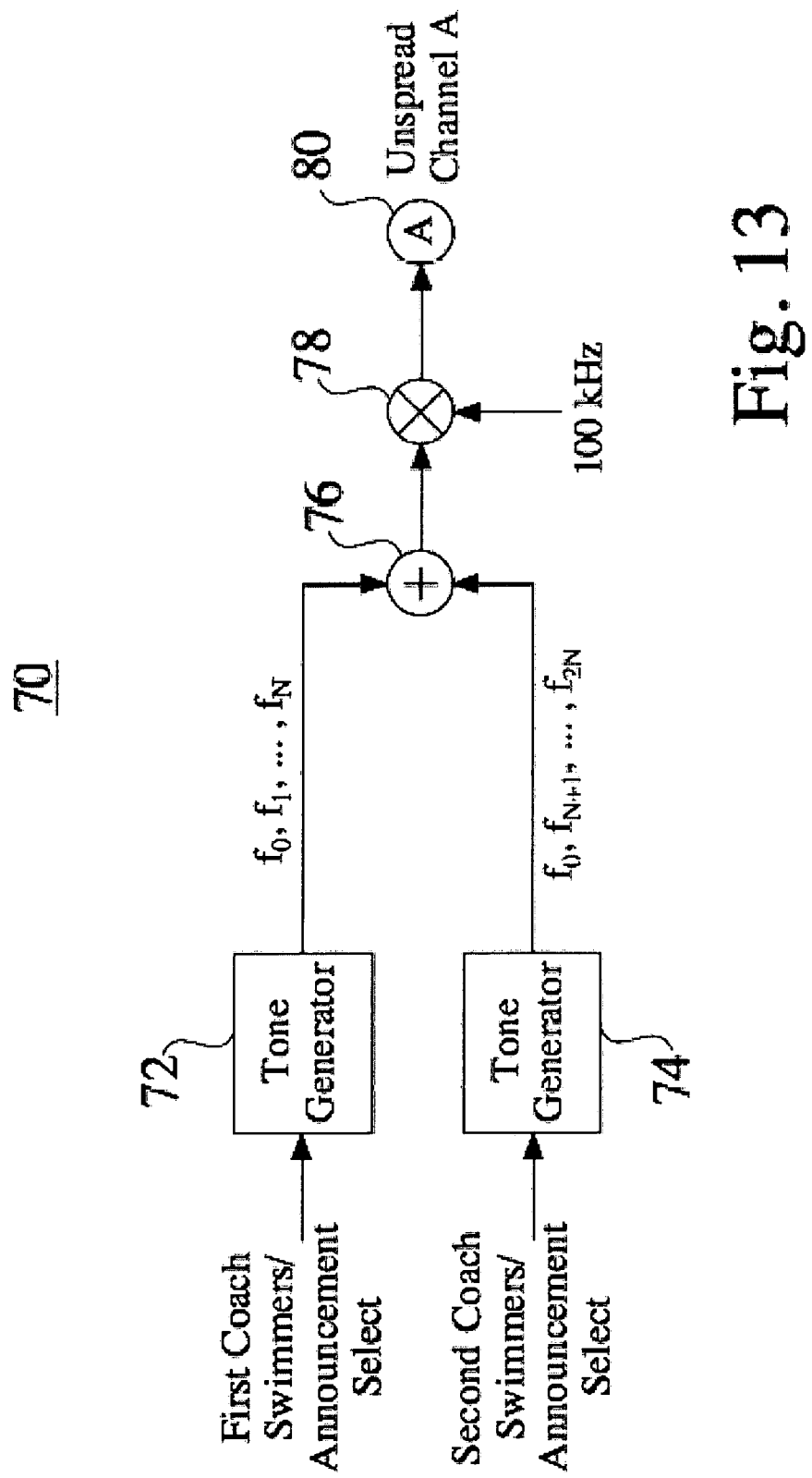

FIG. 13 supplies a schematic view of the radio circuitry that may be utilized in one embodiment of the invention.

Figure 14:
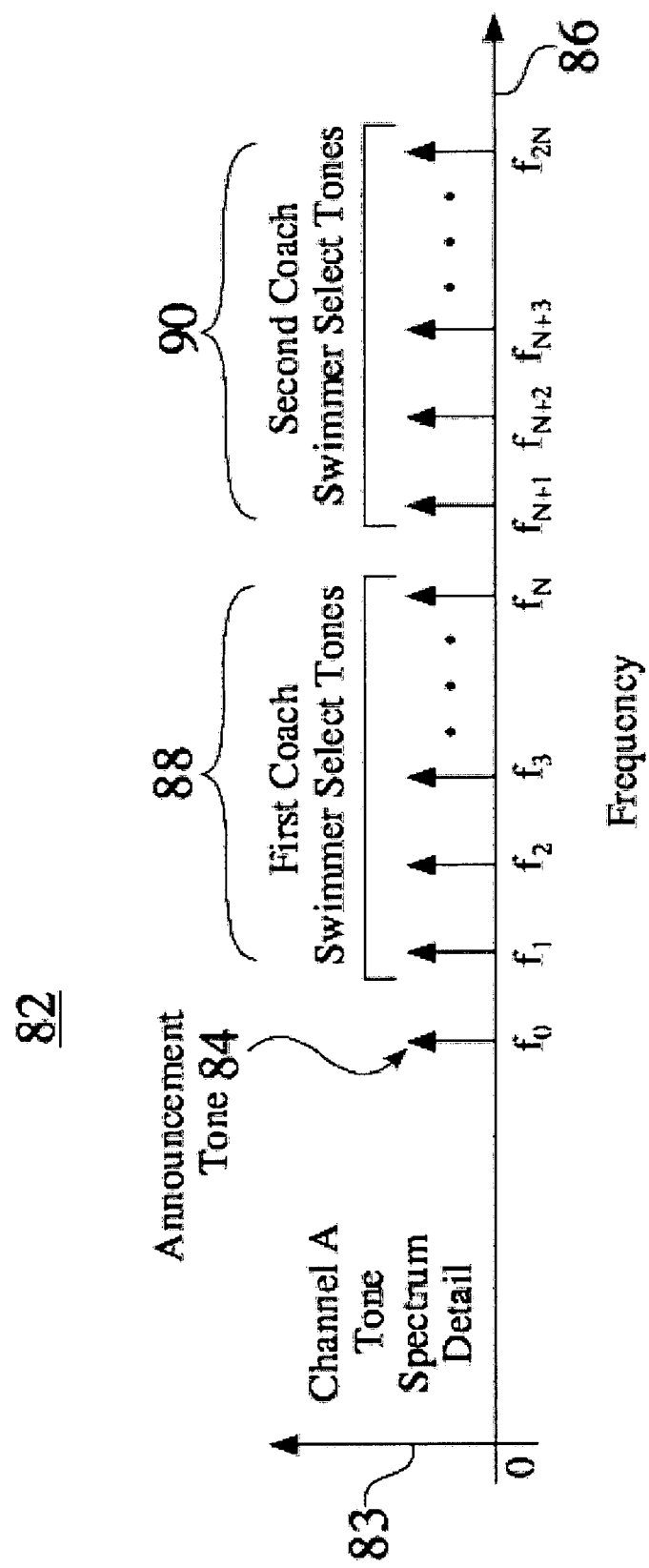

FIG. 14 illustrates frequencies that may be used for wireless communications for the present invention.

Figure 15:
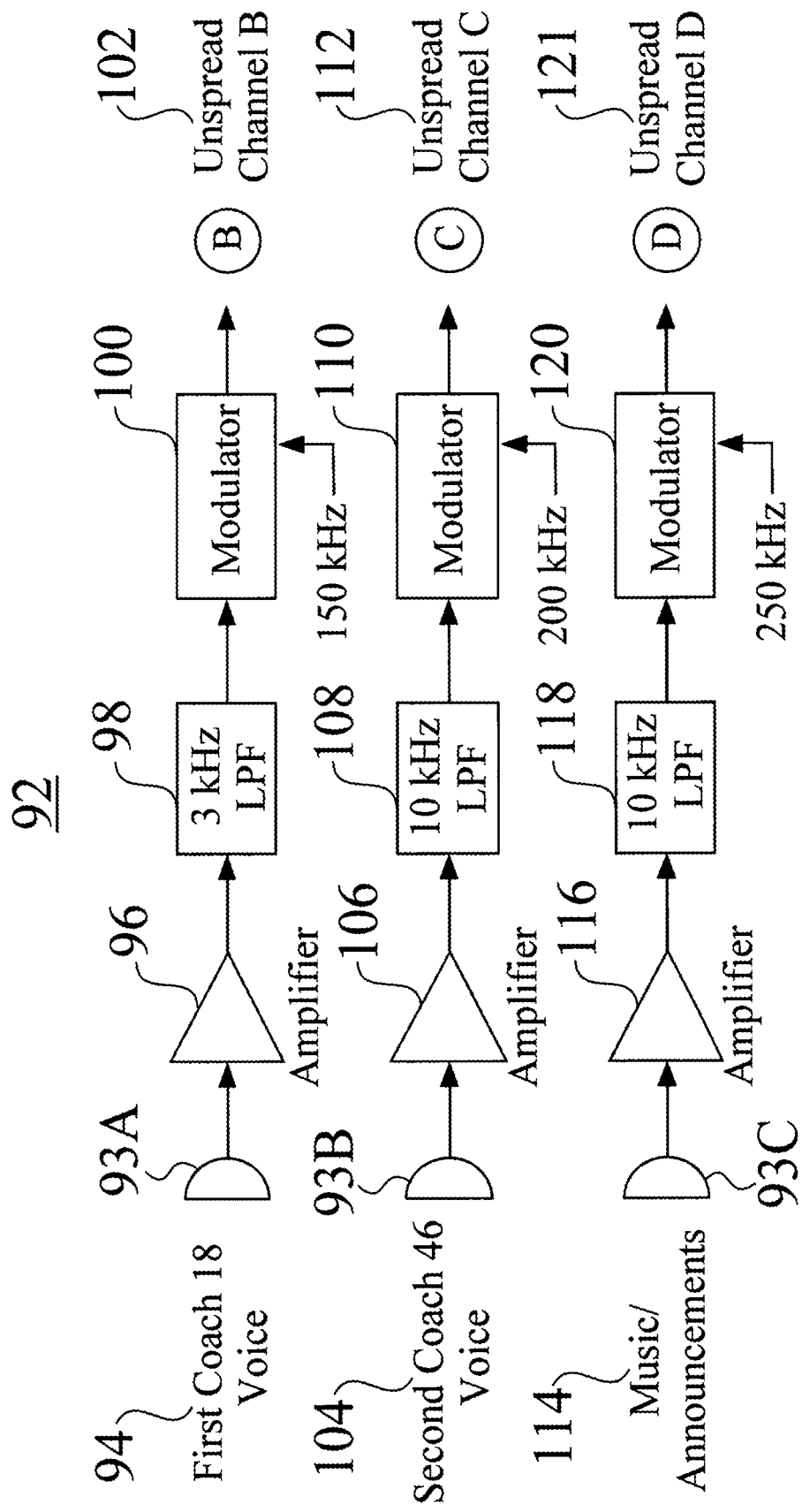
Figure 16:
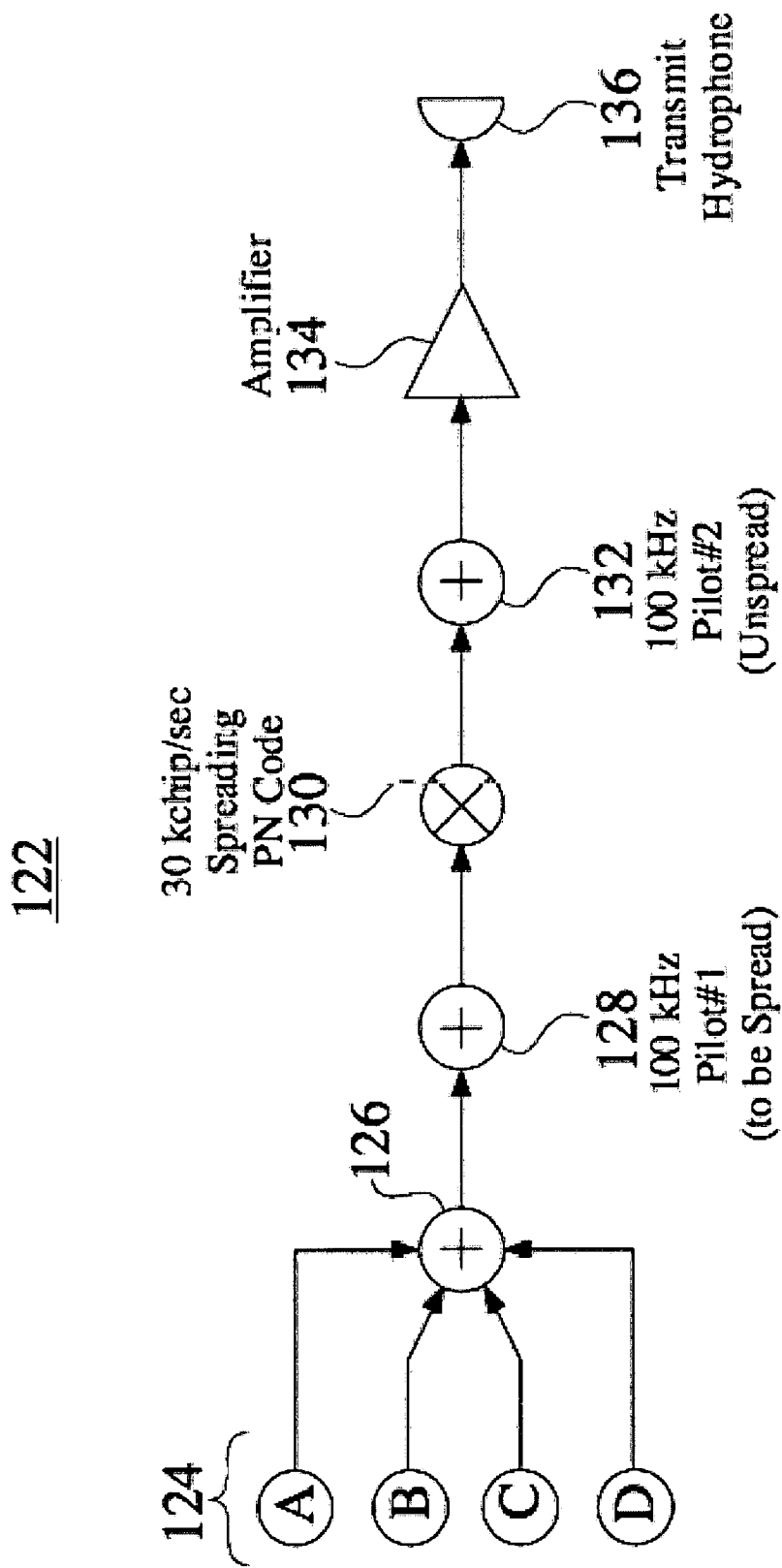

FIGS. 15 and 16 offer additional schematic views of circuit components that may be used to implement one embodiment of the invention.

Figure 17:
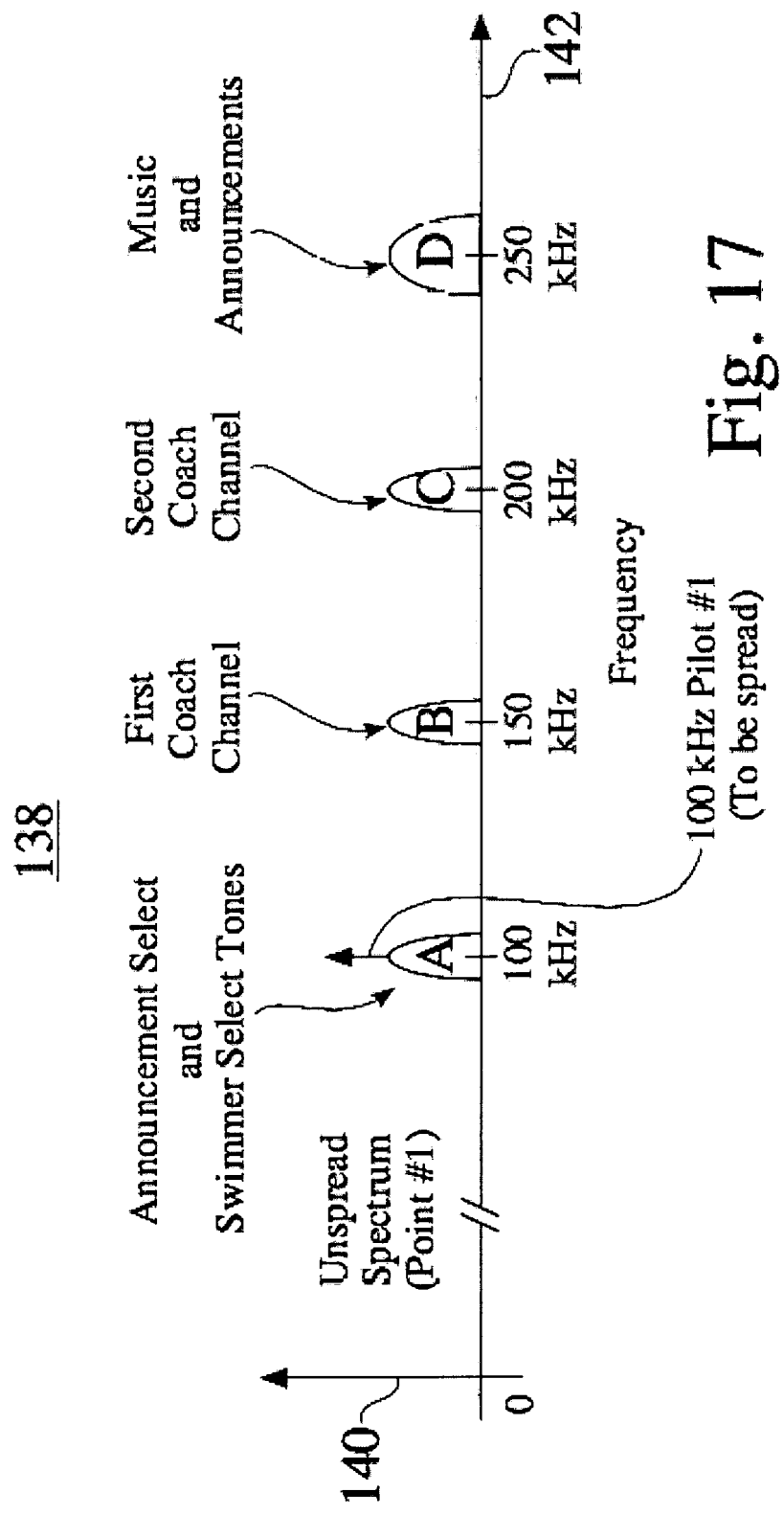
Figure 18:
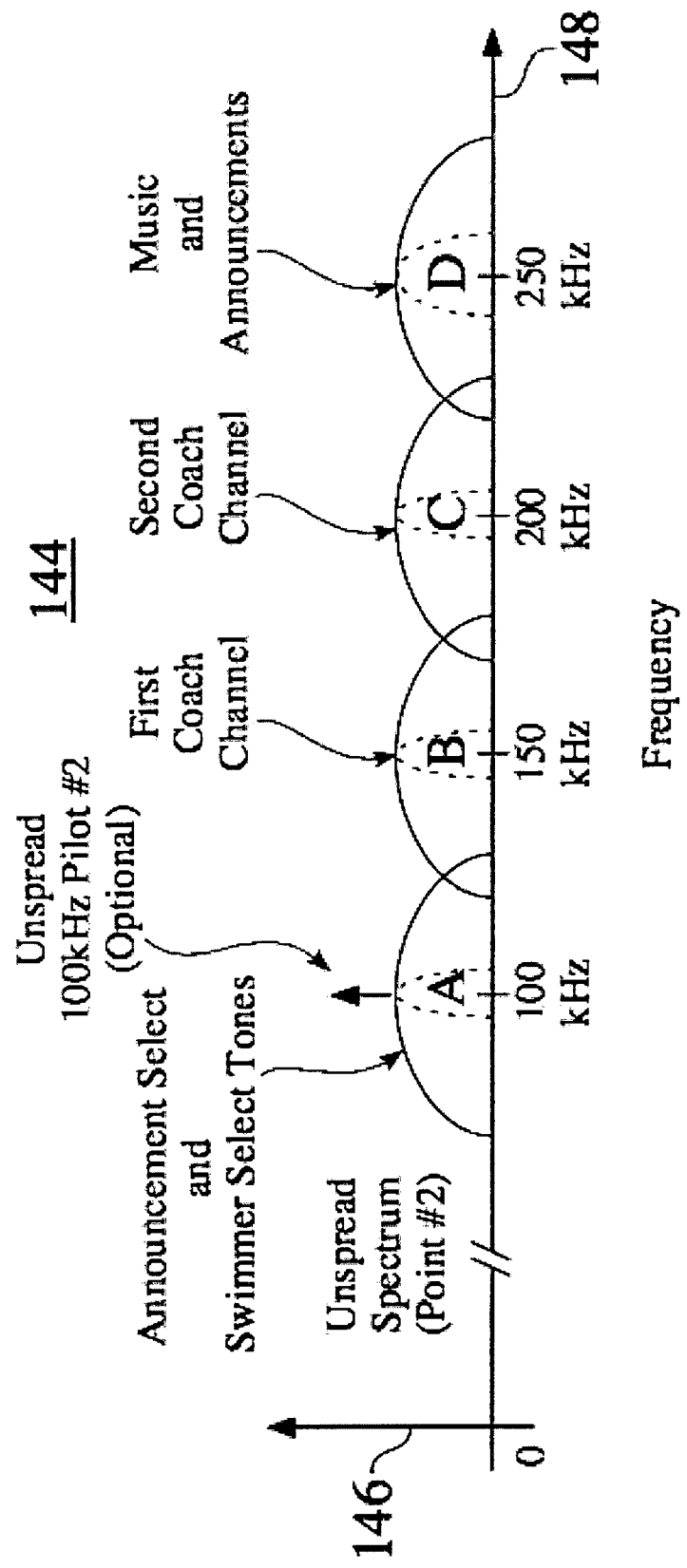

FIGS. 17 and 18 reveal frequency allocations that may be used to implement one embodiment of the invention.

Figure 19:
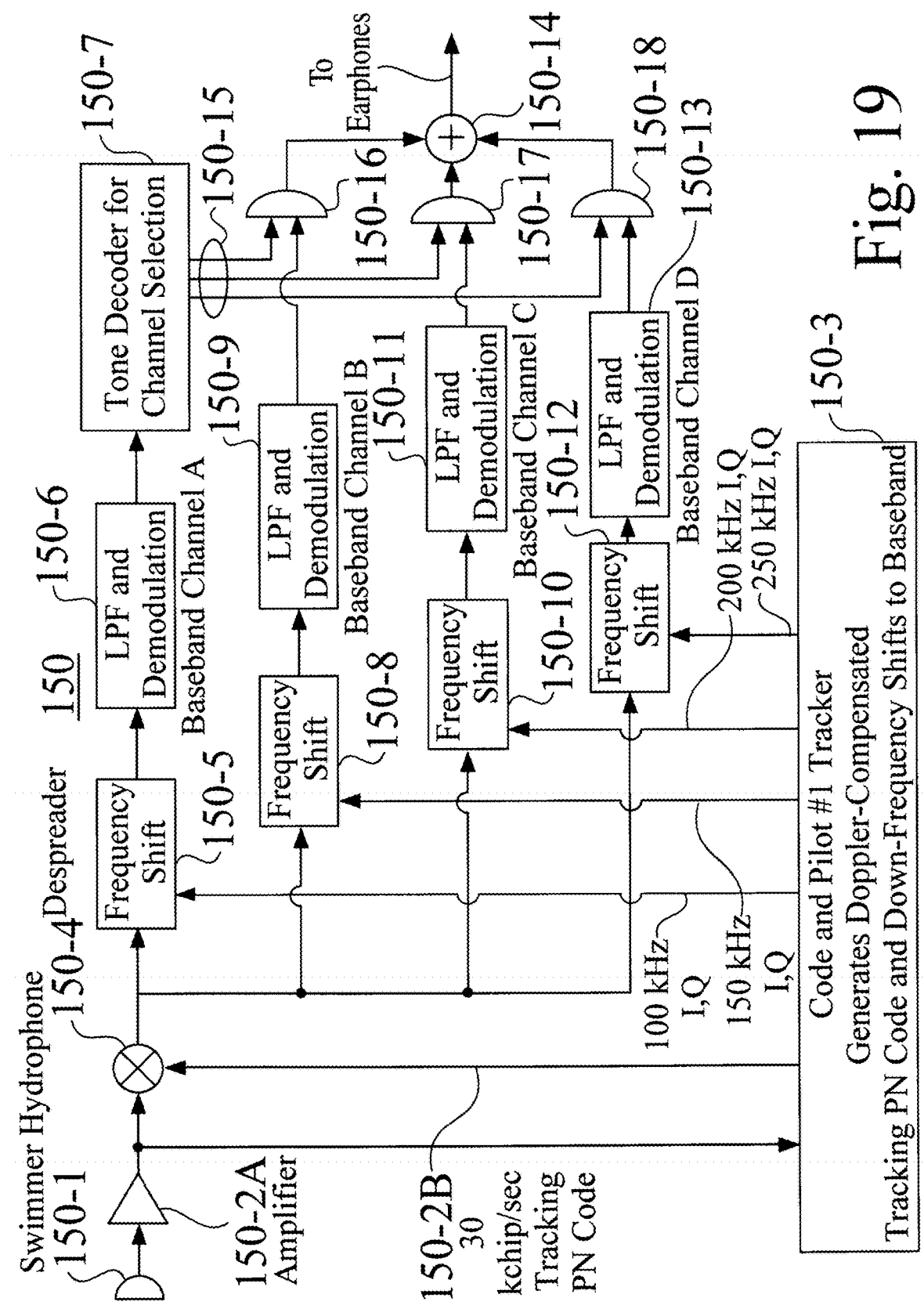

FIG. 19 is a schematic diagram of circuitry that may be employed for wireless communications for one embodiment of the invention.

Figure 20:
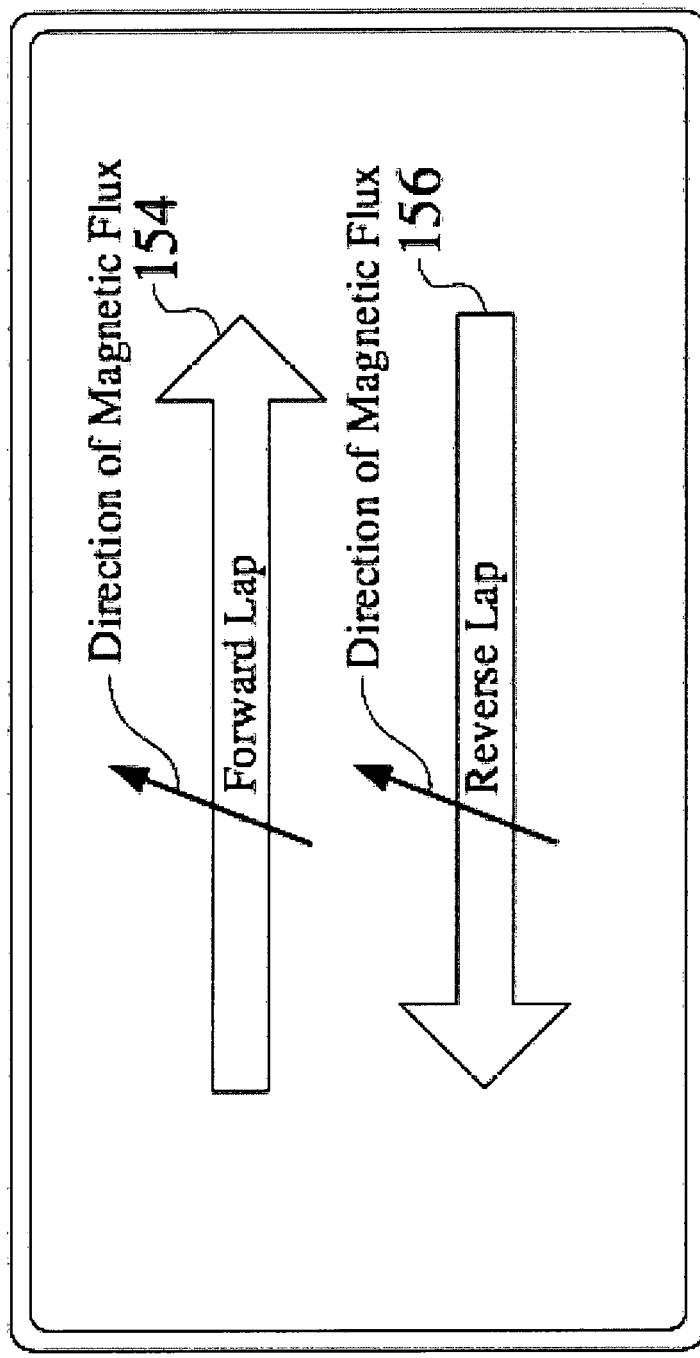
Figure 22:
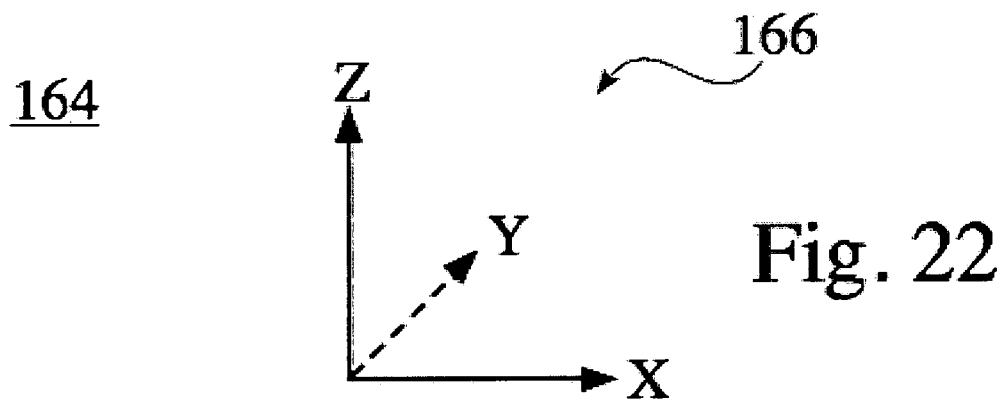

FIGS. 20, 21 and 22 illustrate magnetic flux patterns that are generated by the swimmer's laps in a pool.

Figure 23:
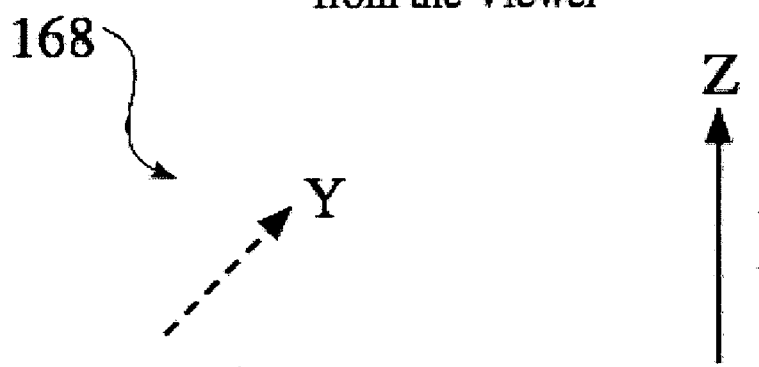
Figure 24:
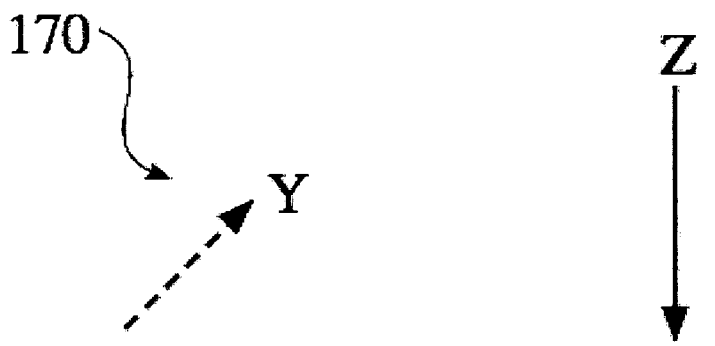

FIGS. 23 and 24 offer representations of a Cartesian Coordinate System that serves as a sensor frame; a depiction of gravity and magnetic flux vectors during a forward lap, and a depiction of gravity and magnetic flux vectors during a reverse lap.

Figure 25:
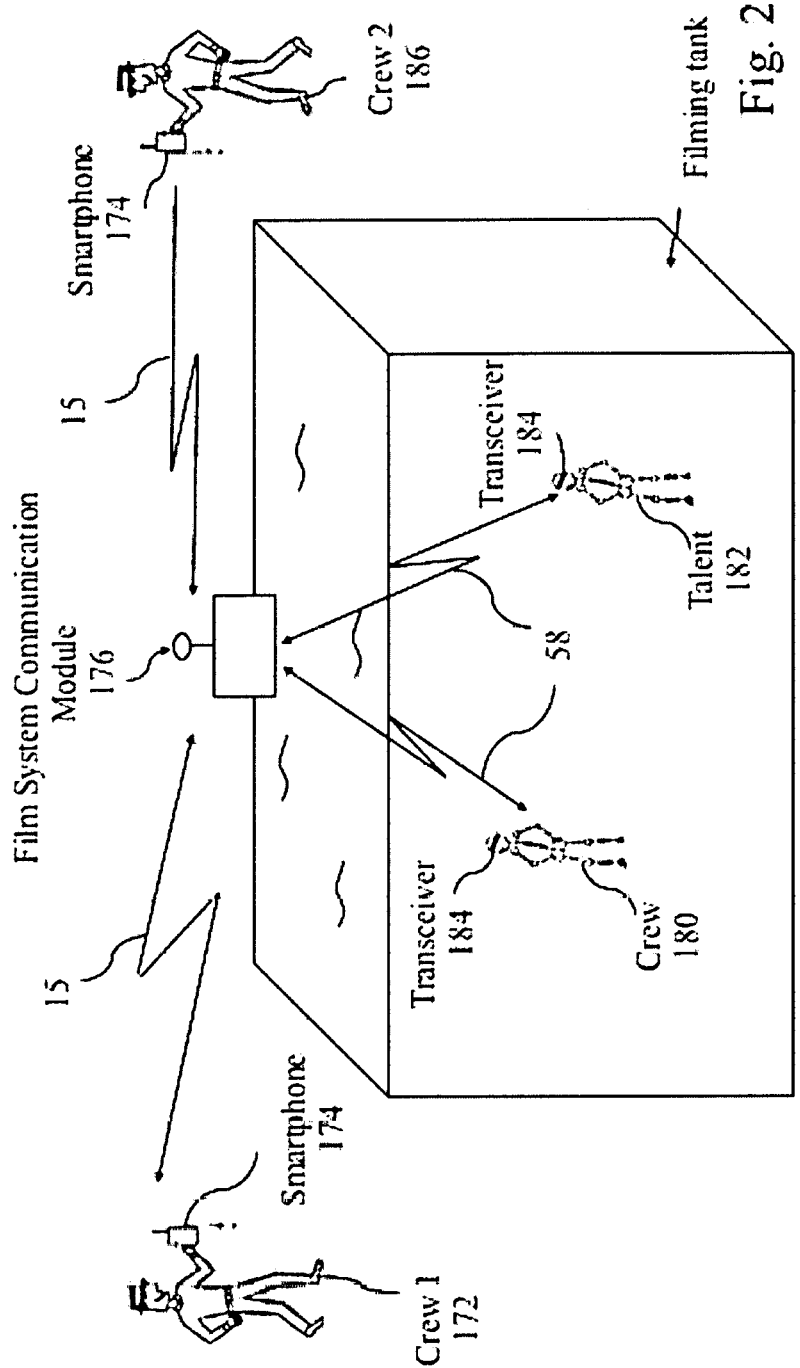

FIG. 25 illustrates the crew and talent communicating while using a filming tank. The users in the tank are wearing transceivers that are able to receive signal from the film communication module at the side of the tank.

Figure 26:
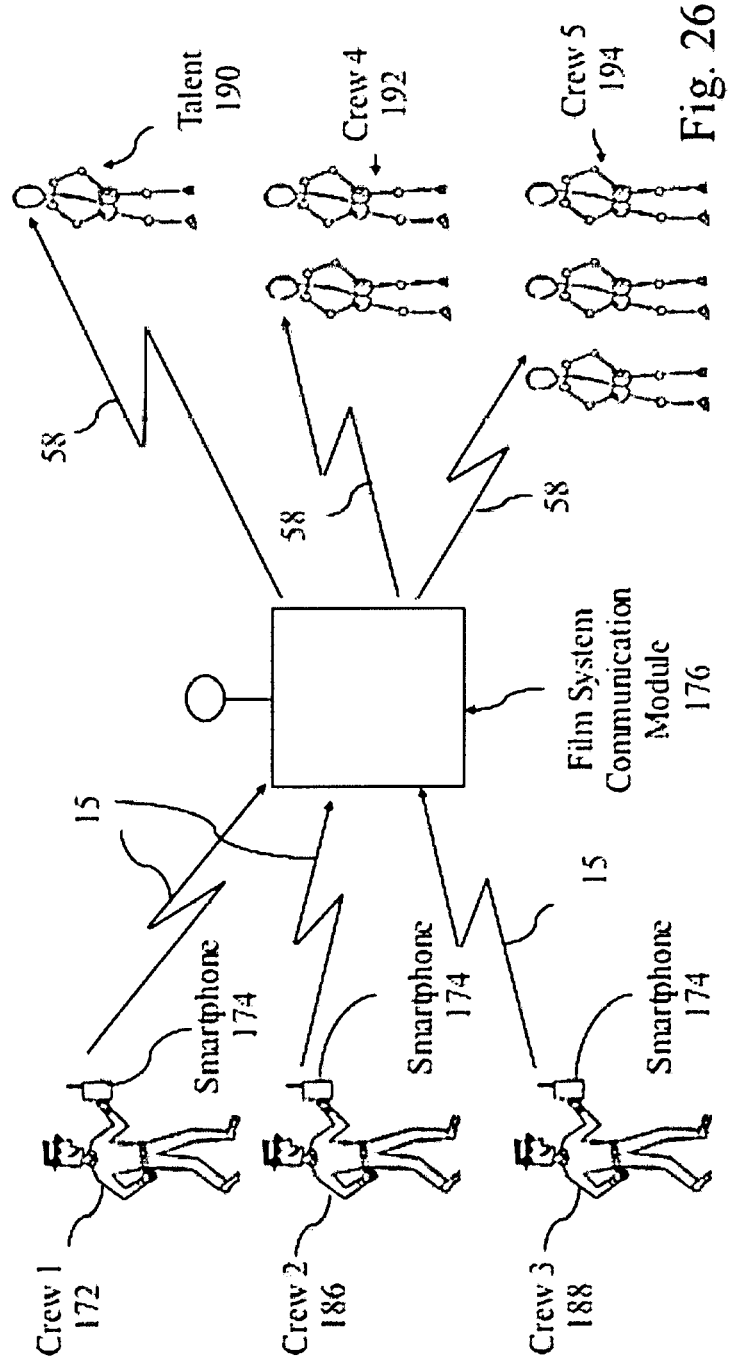

FIG. 26 illustrates how multiple crew members outside of the pool can communicate simultaneously to individual or sub-groups of users wearing the transceiver.

Figure 27:
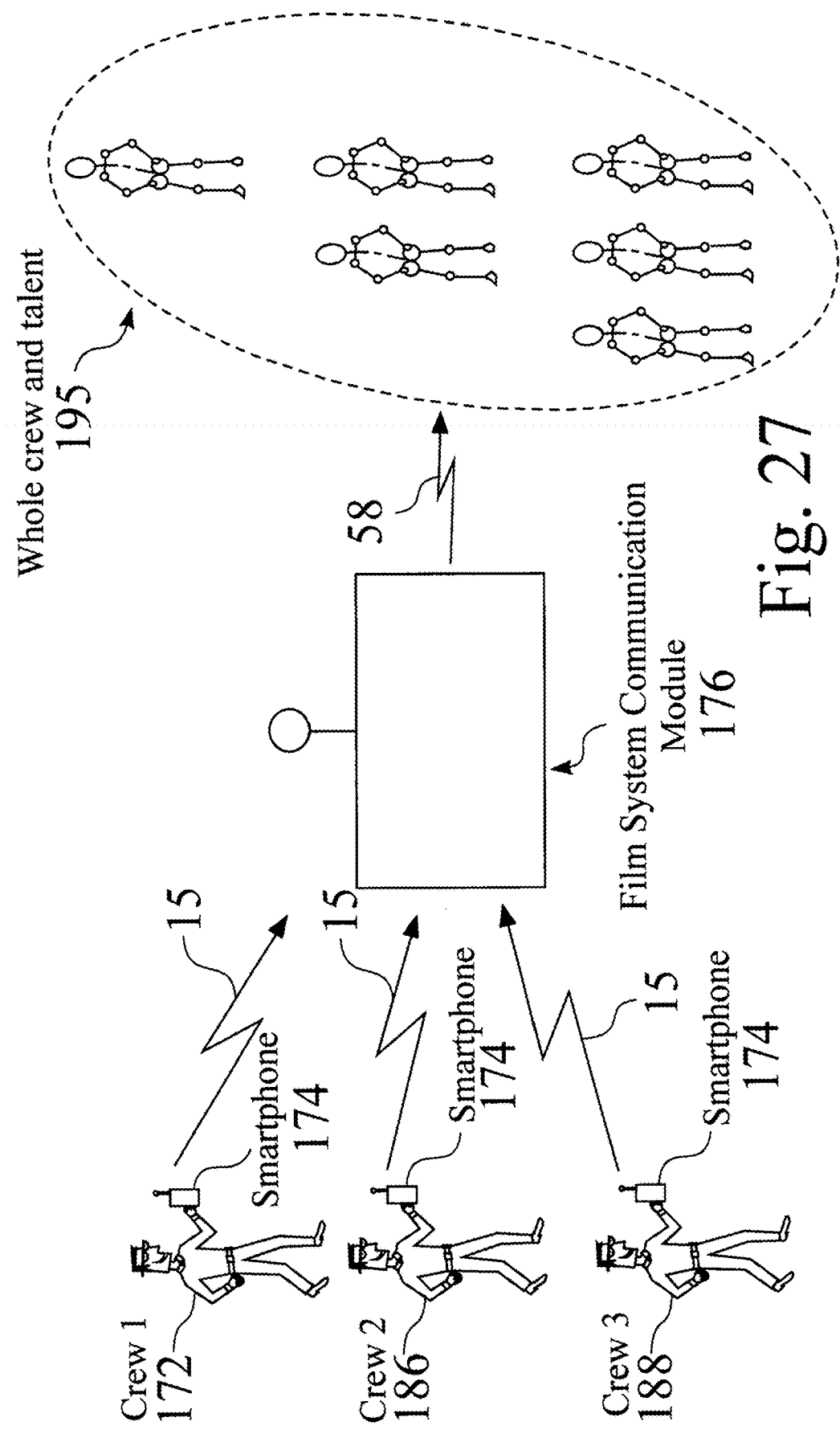

FIG. 27 illustrates how crew members can communicate to all users wearing the transceiver.

Figure 28:
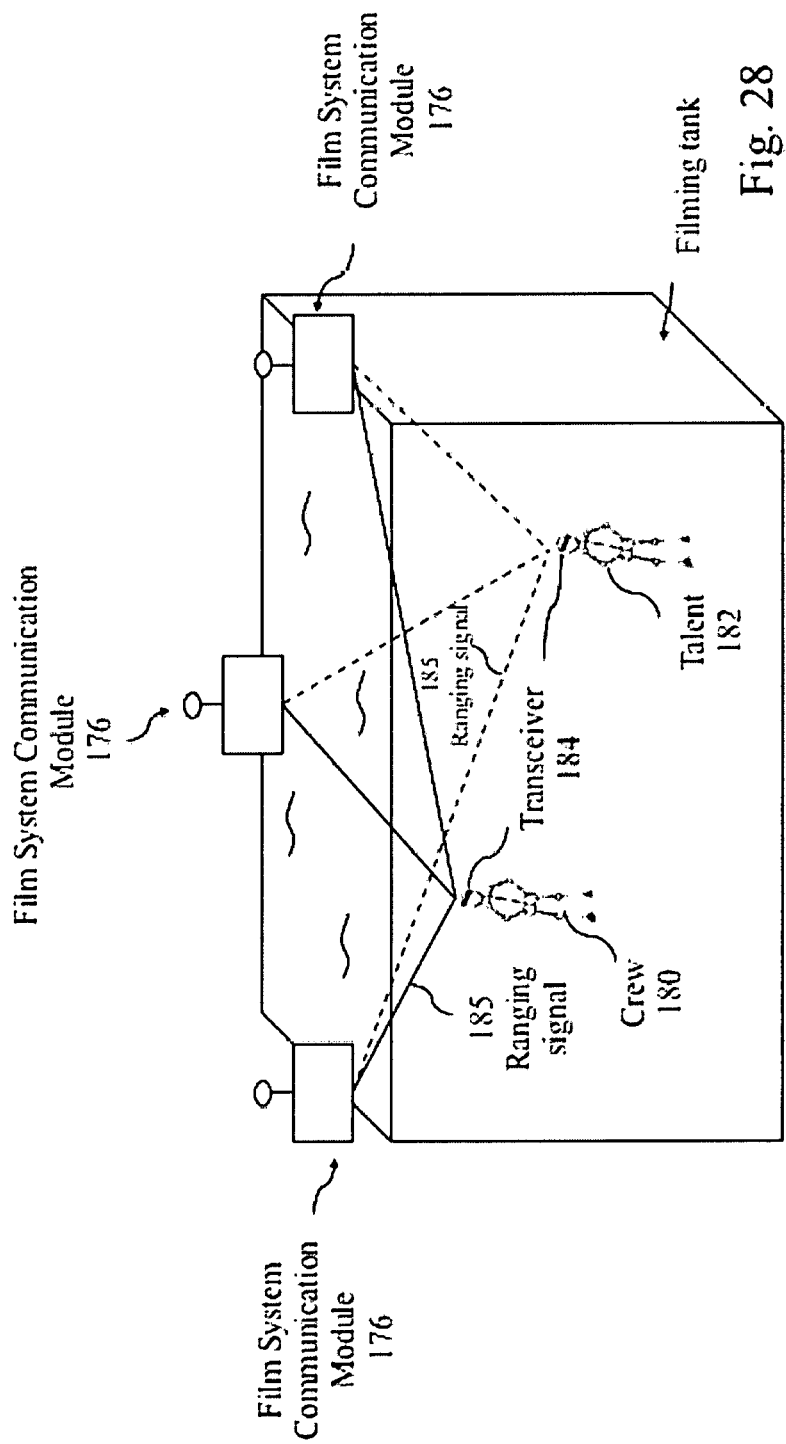

FIG. 28 illustrates how the film system communication module can determine the position of any user wearing the transceiver in the filming tank.

Figure 29:
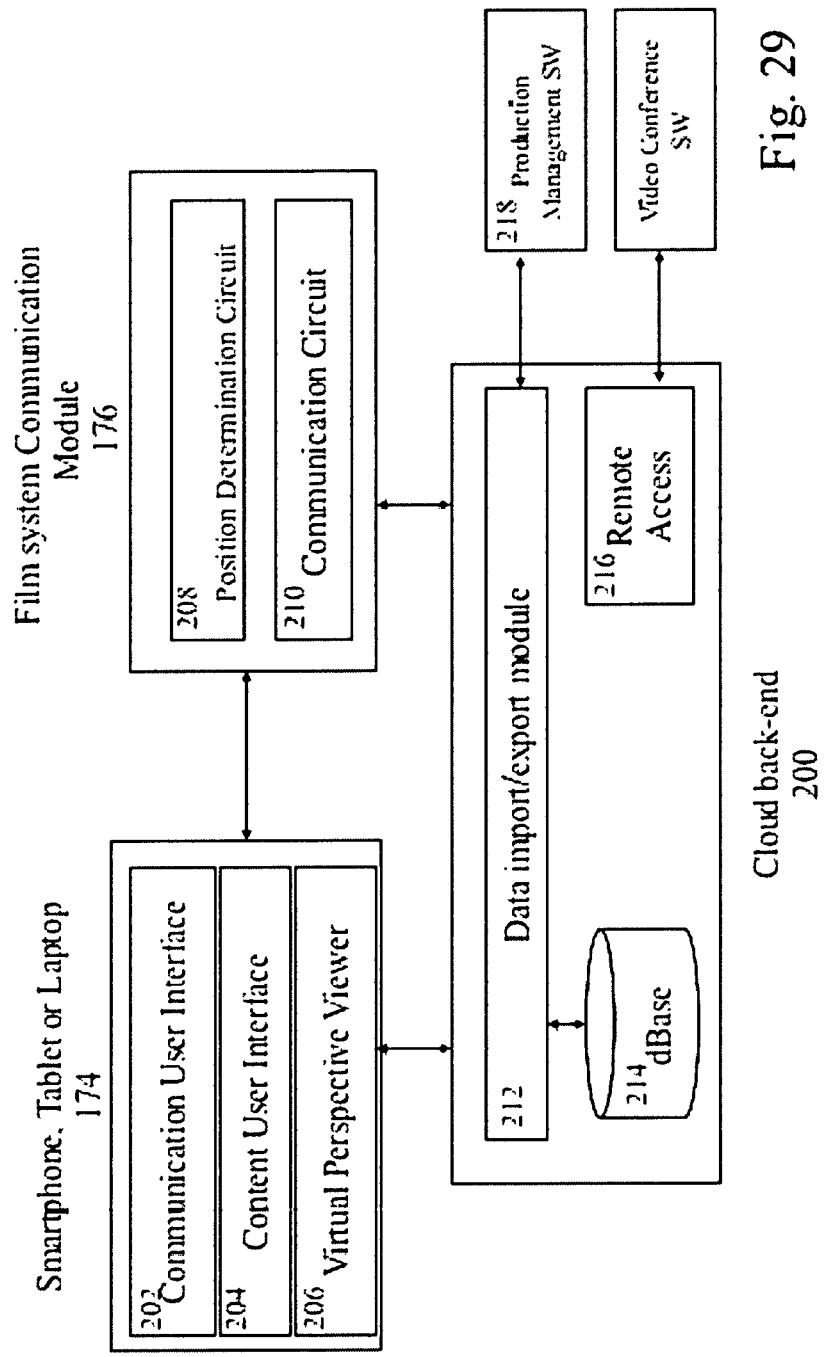

FIG. 29 is a schematic of the main software modules of the system.

Figure 30:
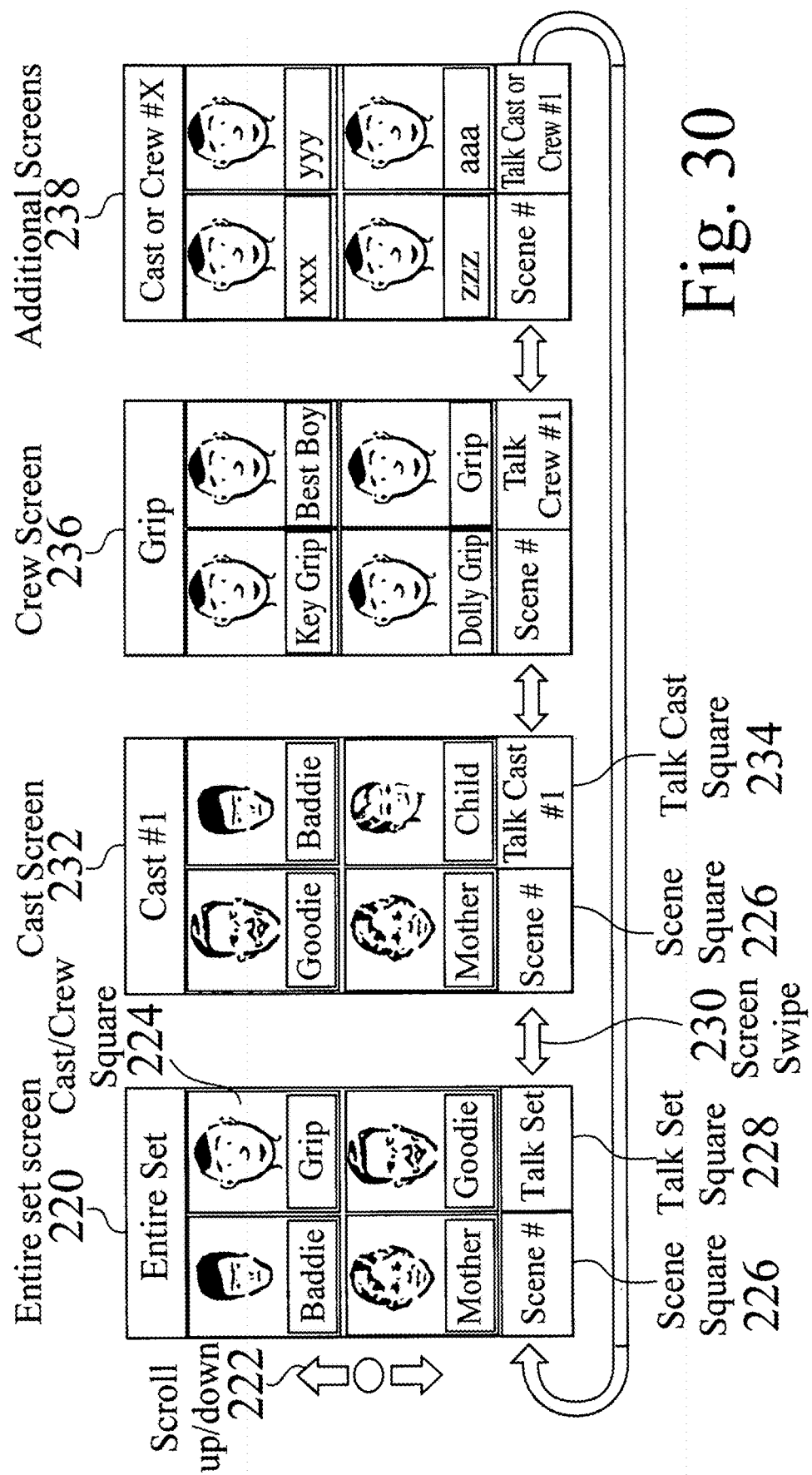

FIG. 30 represents the user interface flow for the selecting sub-groups of users connected film system communication module, how to bring up information on their specific tasks and how to open a communication link to them.

Figure 31:
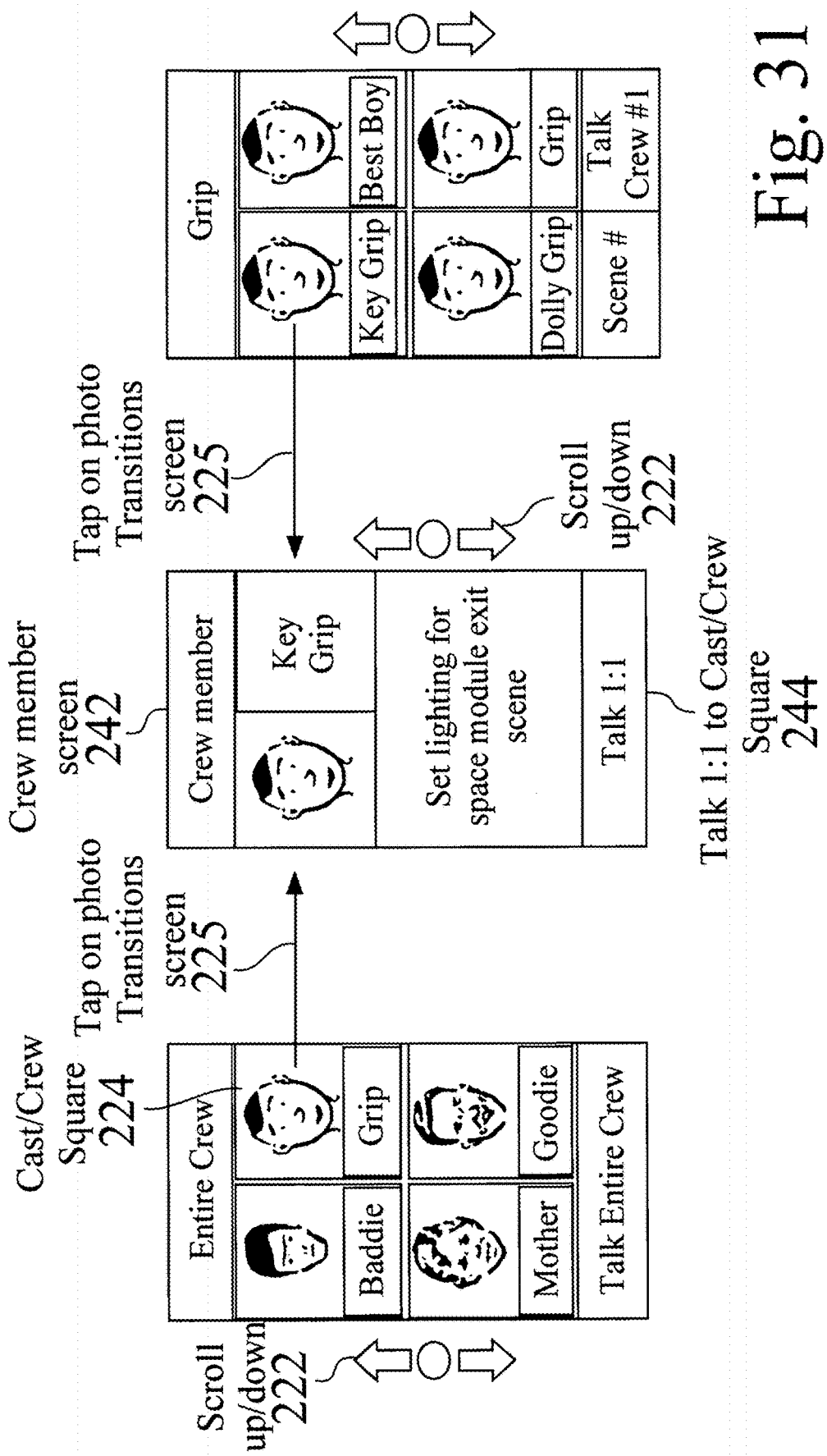

FIG. 31 represents the user interface flow for how to select an individual user to communicate with.

Figure 32:
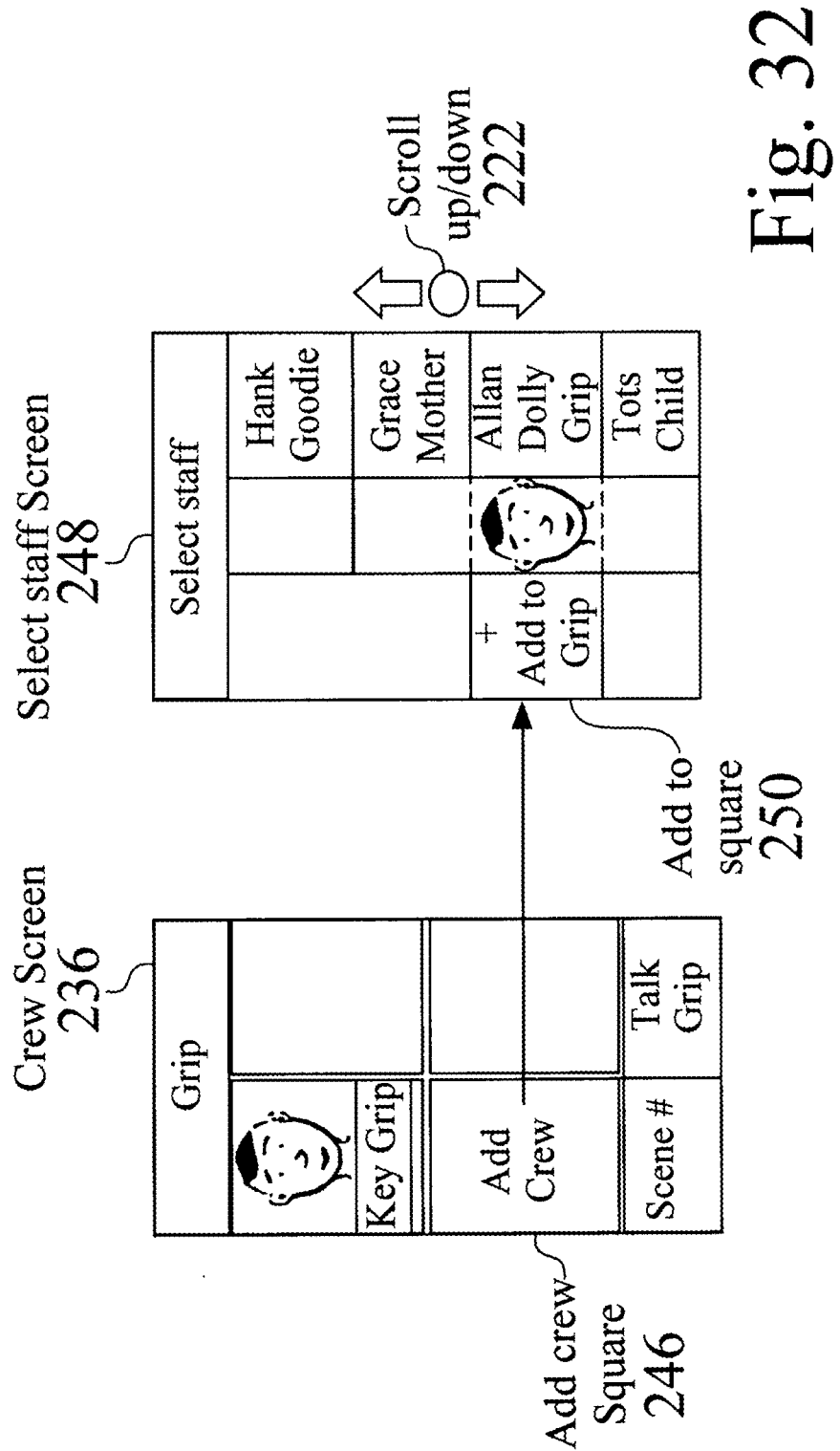

FIG. 32 represents the user interface flow for how to add a new member to a sub-group of users.

Figure 33:
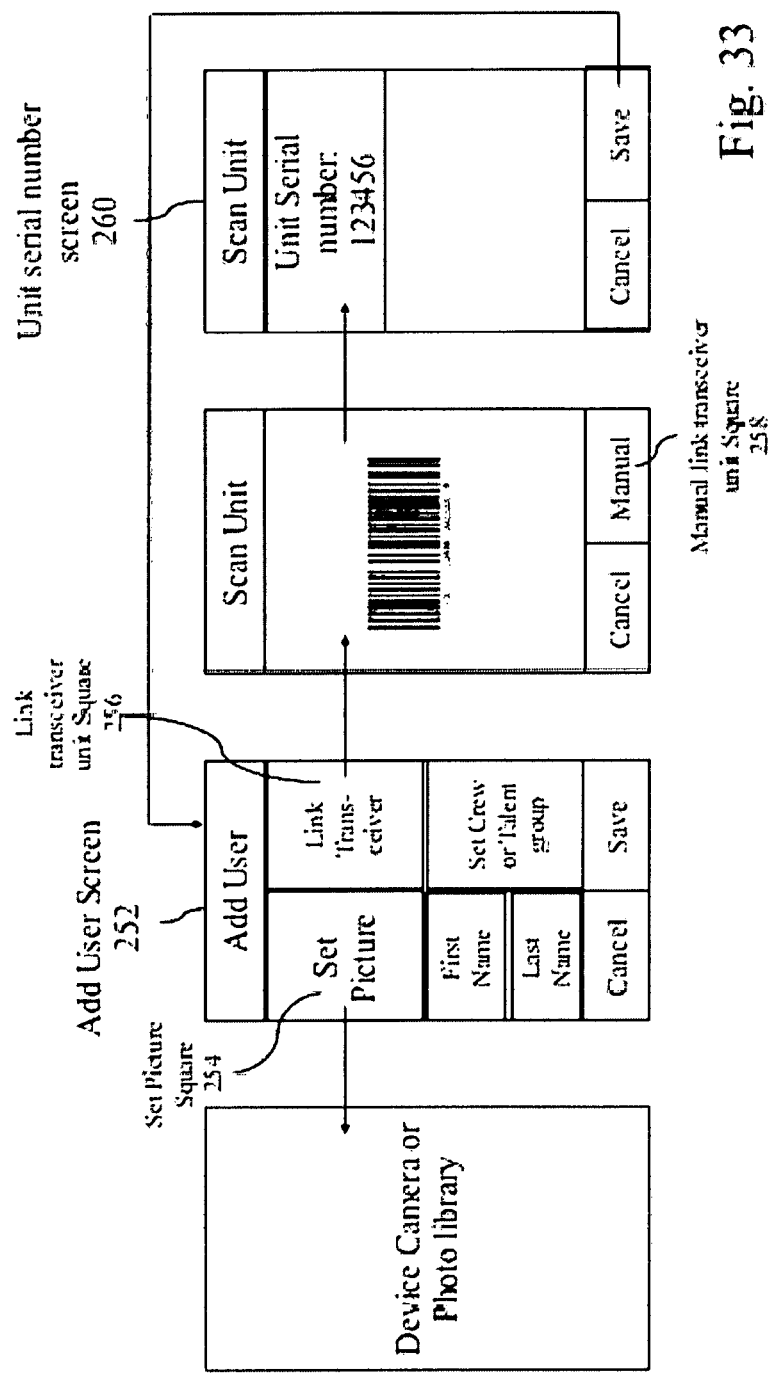

FIG. 33 represents the user interface flow for adding a user to system and associating a transceiver with that user.

Figure 34:
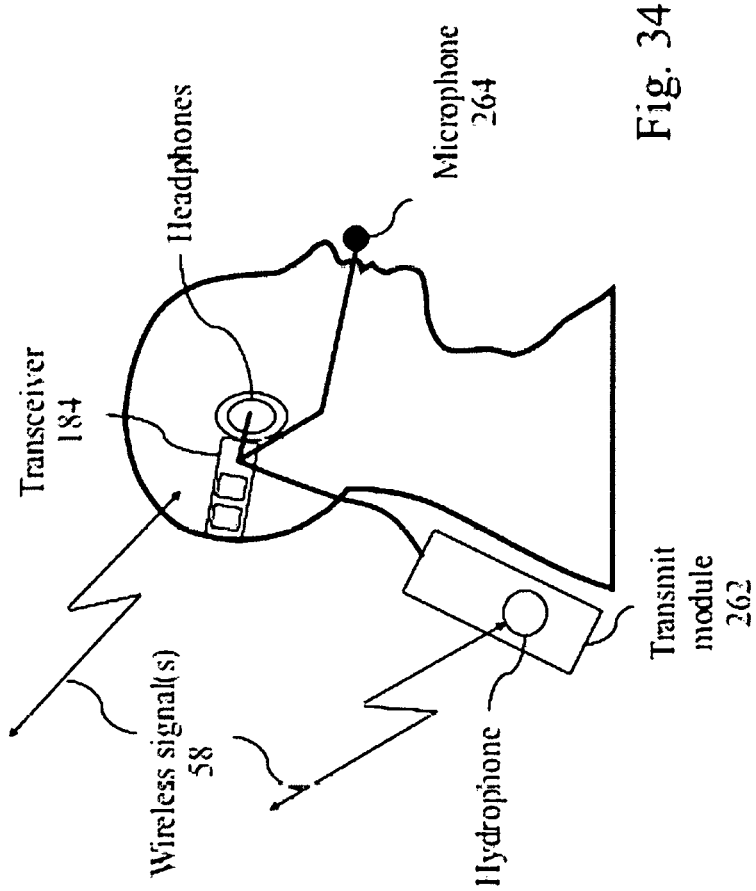

FIG. 34 illustrates the addition of a microphone and transmit module for enabling two-way verbal communication with the user in the filming tank.

Figure 35:
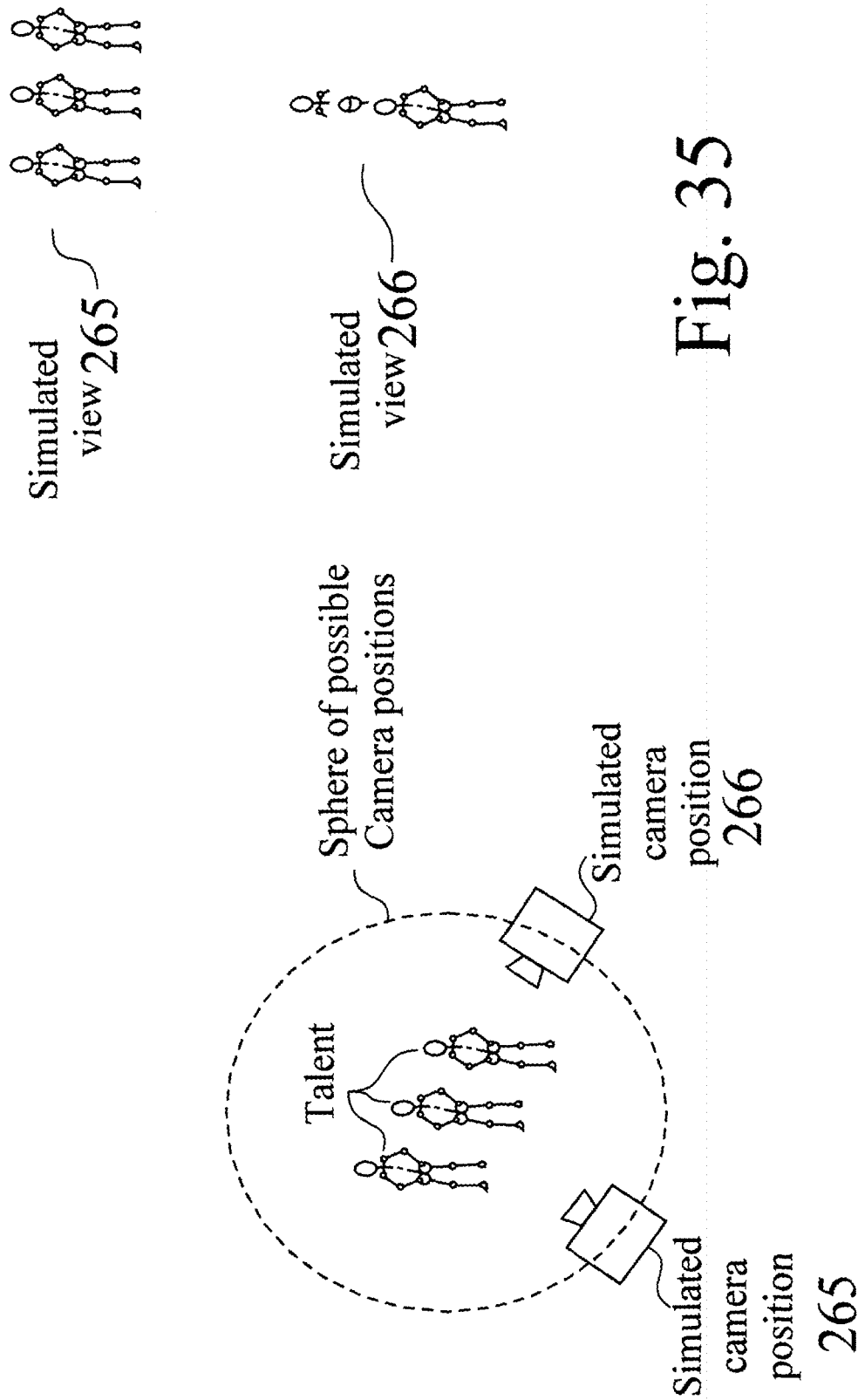

FIG. 35 illustrates the camera angle simulation capability, two camera angles are simulated here.

FIG. 36 illustrates the elements of the standard transceiver.

FIG. 37 is a block diagram of the software resident on the smartphone, tablet or computing device.

FIG. 38 is a block diagram of the Production Management software.

A DETAILED DESCRIPTION OF PREFERRED & ALTERNATIVE EMBODIMENTS

Section One:
Overview of the Invention

Figure 1:
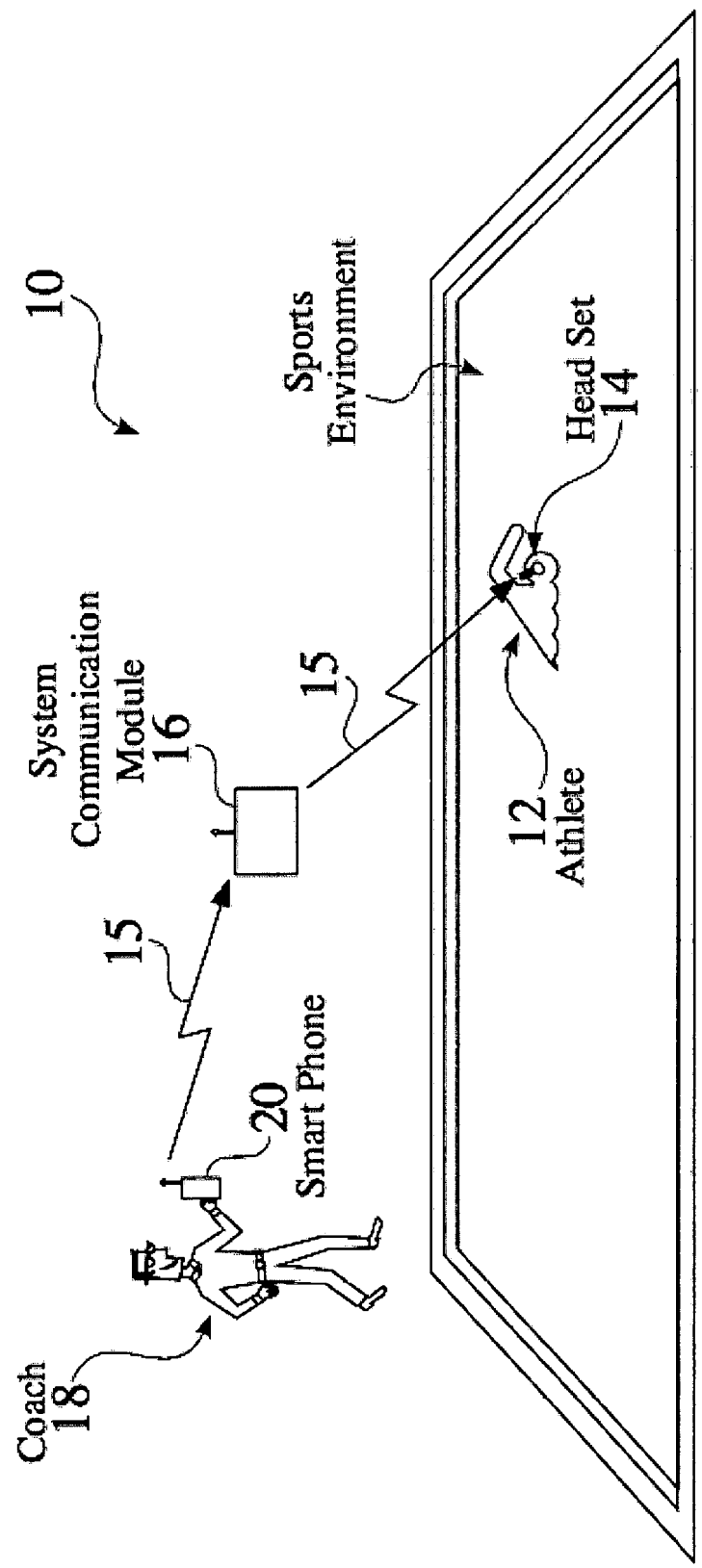
FIG. 1 illustrates a swimmer in a pool who is being monitored by a coach. The swimmer wears a headset that enables him or her to receive multiple wireless streams of content from a system communication module near the pool.

FIG. 1 depicts a generalized view 10 of one embodiment of the invention. A swimmer 12 wearing a remote transceiver or headset 14 communicates over a wireless link 15 with a system communication module 16, which operates nearby the pool. A coach 18 using a smart phone 20 also communicates over a wireless link 15 through the system communication module 16. The wireless link 15 may be a radio frequency signal that is propagated through the air, and/or an ultrasonic link that is transmitted through water. In alternative embodiments of the invention, the wearer of the headset 14 may be a person engaged in a wide variety of athletic activities in any number of sports environments. In this Specification, and in the Claims that follow, the term "wireless link" is intended to encompass any transmission of data, information or content between or among a number of mobile transceivers. Specifically, the wireless link may be propagated as one or more Wi-Fi, WiMax, Bluetooth, cellular, radio frequency, ultrasonic signals, or any other suitable emanation that connects the user of the headset or device 14 with one or more other persons or terminals.

Figure 2:
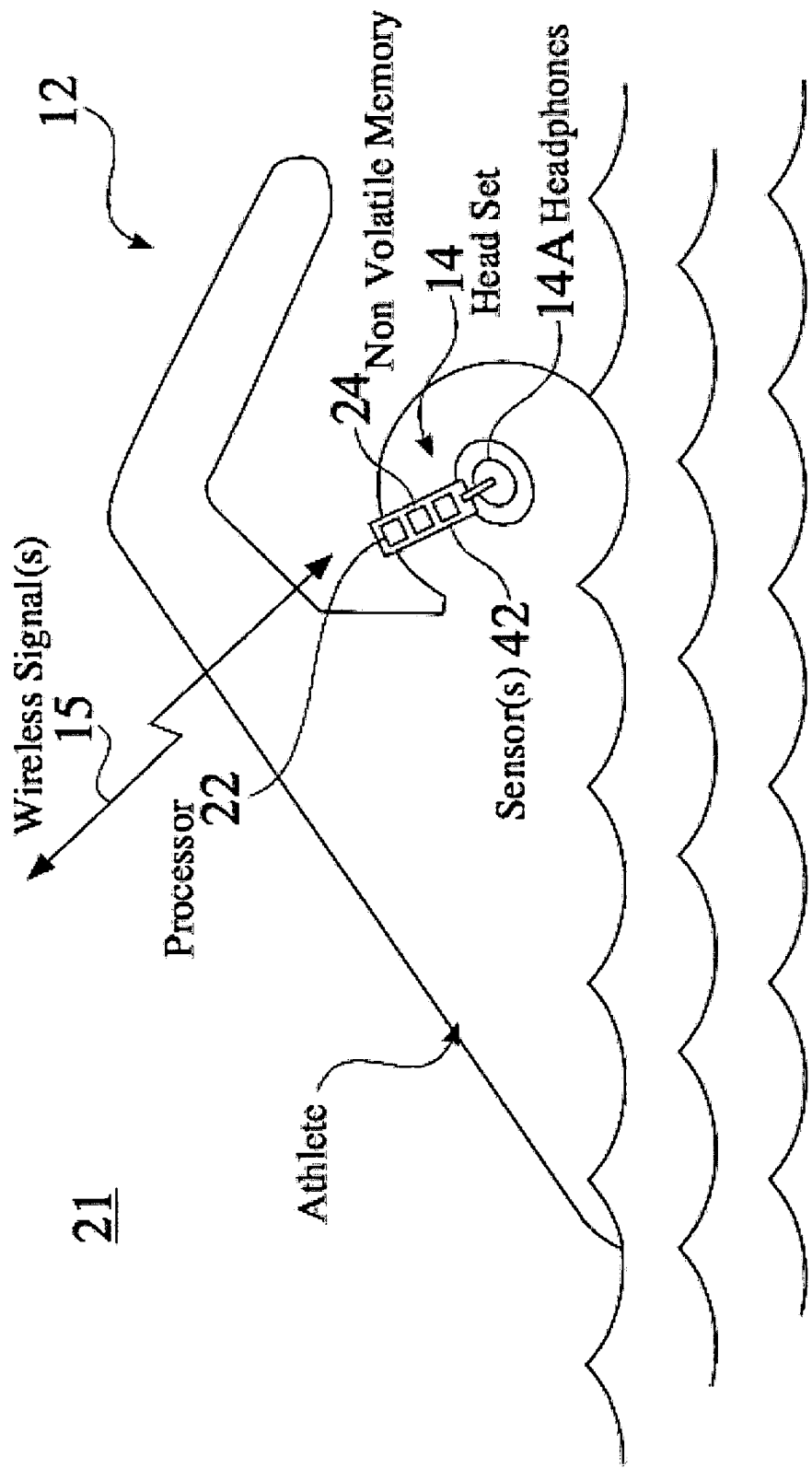
FIG. 2 is a close-up view of the swimmer in the water.

FIG. 2 offers an expanded view 21 of the swimmer 12 in the water. The headset 14 includes a processor 22 and a non-volatile memory 24. In this Specification, and in the Claims that follow, the term "headset" is a remote transceiver that is intended to encompass any device worn by or associated with an individual which is capable of transmitting or receiving wireless signals and producing audio which may be heard by the individual. The wireless signals may be sent to or received from a standard computer, a laptop, a tablet, a smart phone or some other suitable personal computing device or information appliance.

Figure 3:
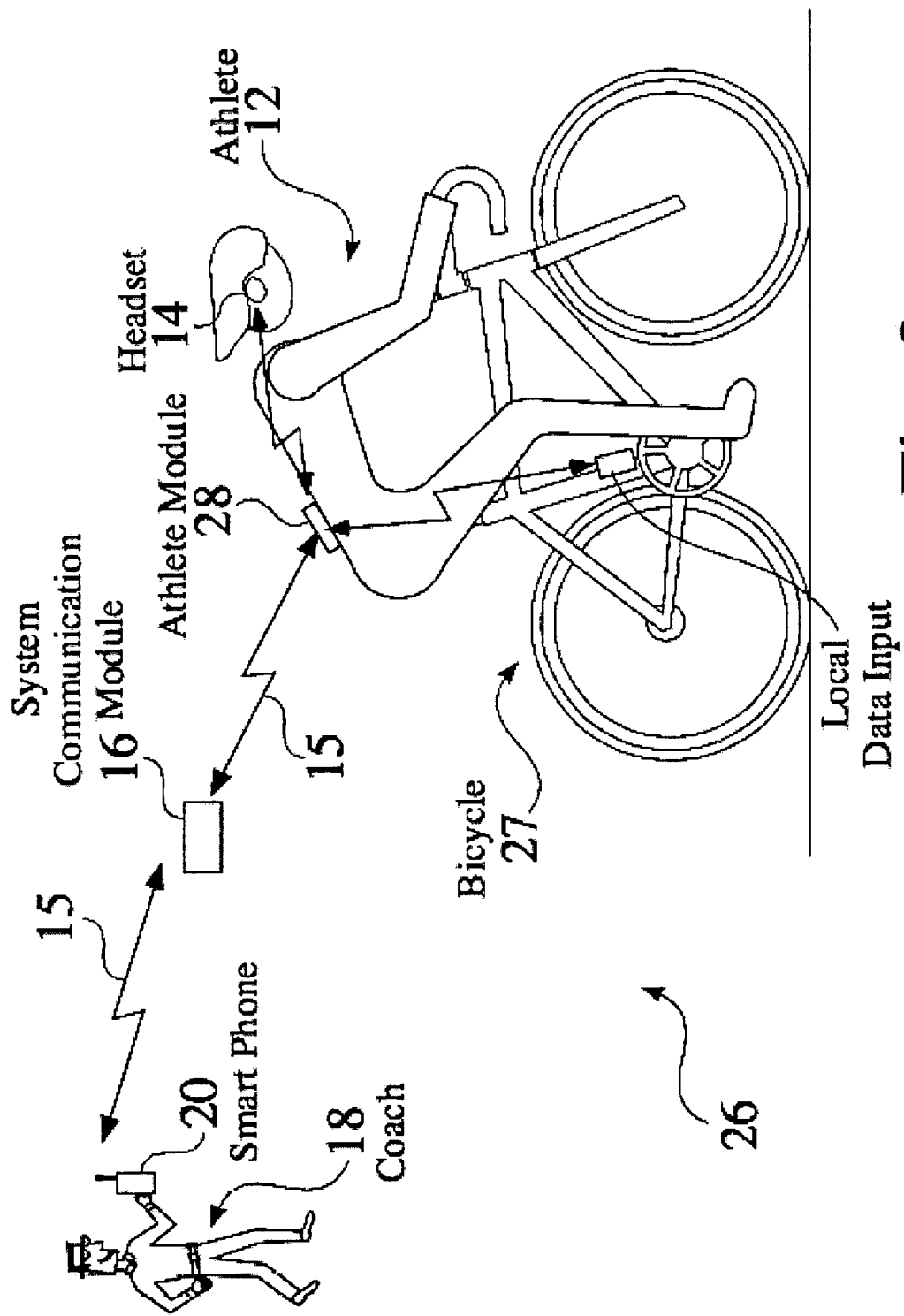
FIG. 3 shows a bicyclist wearing a headset which communicates with the coach through the system communication module.

FIG. 3 provides a generalized view 26 of an athlete 12 on a bicycle 27. The headset 14 is connected to an athlete module 28 which sends and receives information over a wireless link 15 to the system communication module 16. The coach 18 uses his smart phone 20 to communicate to the system communication module 16 over another wireless link 15.

FIG. 4 presents a schematic block diagram 30 which illustrates the components of one particular embodiment of the circuitry that resides inside the headset 14. The headset 14 includes a transceiver 32 which is connected to an antenna 34 and a processor 36. The processor 36 is connected to a non-volatile memory 38, a power source 40, and one or more sensors 42. In this particular embodiment, the sensor package 42 includes three mutually orthogonal accelerometers and three magnetic sensors.

In alternative embodiments, the user may wear a different, but generally equivalent device that functions like the headset 14. As examples, the headset 14 could be configured so that it is clipped to a belt, or worn on an armband. In another embodiment, the headset may be configured so that its functions are physically separated into different modules such as: external battery, hear rate sensor on a chest belt, motion sensors on ankle and wrist, processor module on headband or helmet.

FIG. 5 portrays a schematic diagram 44 that shows that more than one user (Coach 18 and Coach 46) may communicate over different wireless links 15 with the system communication module 16 using smart phones 20 and 48. In alternative embodiments, persons may communicate with the system communication module 16 using a variety of information appliances, including, but not limited to, tablets, personal computers, laptops, netbooks, radios or any other suitable device that is capable of wireless communication.

FIG. 6 reveals a view 50 of the circuitry within one embodiment of the system communication module 16. The system communication module 16 generates one or more streams of content, information or data which may include initial coach input, audio entertainment and/or coaching updates. The athlete's device 14 may transmit a number of different streams of information back to the system communication module 16, including, but not limited to, heart rate, speed, location, motion, altitude, incline, cadence and/or steps.

FIG. 7 depicts one configuration of the present invention. A smart phone, such as an iPhone™, transmits audio files over a wireless link 15 to the system communication module 16, which, in turn, relays the audio files over another wireless link 15 to the swimmer's device 14.

In FIG. 8, a coach 18 using an information appliance 20 transmits information over a wireless link 15 to the system communication module 16, which, in turn, conveys the information to the swimmer's headset 14 using an ultrasonic signal 58 that propagates through the water in the pool. Automated performance sensors are shown connected to the swimmer's transceiver 14.

FIGS. 9 and 10 reveal additional configurations 58 and 60 of the present invention. In FIG. 9, a coach 18 with an information appliance 20 receives information over a wireless link 15 from the system communication module 16, which has received the information over another wireless link 15 from the swimmer's device 14. In FIG. 10, a coach 18 with an information appliance 20 transfers new audio data to the system communication module 16, and then on to the swimmer's device 14.

FIG. 11 presents a flow chart 62 that shows the method steps of one embodiment of the present invention, which coordinates the multiple audio streams that are delivered to the headset.

FIG. 12 is a spectrum 64 of transmitted signal strength 66 plotted against frequency 68. Four content streams or channels labeled A, B, C and D are shown along a frequency band that spans 100 to 250 KHz. FIG. 12 depicts a particular embodiment of an ultrasonic underwater communication system used for communication with a swimmer. Other embodiments may use other specific ultrasonic frequencies.

FIG. 13 is a schematic diagram 70 that illustrates the signal processing used to combine two ultrasonic communication links used simultaneously in the same swimming pool by two different coaches, as depicted in FIG. 5. Two separate swimmer selector tones 72 and 73 are produced by tone generators 74 and 75, and are then combined by a signal adder 76. The combined signal is then converted to a final frequency band through multiplication of a reference frequency 78. The resulting unspread signal 80 is passed to further processing (see FIG. 16, below).

FIG. 14 offers a graph 82 of the frequency components of only the swimmer select channel A of the composite ultrasonic signal. One of the frequencies is used for an announcement tone 84. The graph plots signal strength 83 versus frequency 86. At different points in the frequency band 86, the various select tones will be at their unique frequencies. One group of select tones from a first coach 88 will be separated from another group of select tones from a second coach 90.

FIG. 15 supplies three schematic diagrams that reveal how three different content channels are transmitted. A first coach 18 provides voice commands which are conveyed through amplifier 96, a Low Pass Filter 98 (3 kHz in this embodiment) and are modulated at a specific frequency (150 kHz in this embodiment) via modulator 100 to produce one unspread audio channel (B) 102. A second coach 46 provides voice commands which are conveyed through amplifier 106, a Low Pass Filter 108 (10 kHz in this embodiment) and are modulated at a specific frequency (200 kHz in this embodiment) via modulator 110 to produce one unspread audio channel (C) 112. Music and/or announcements 114 are conveyed through amplifier 116, a Low Pass Filter 118 (10 kHz in this embodiment) and are modulated at a specific frequency (250 kHz in this embodiment) via modulator 120 to produce one unspread audio channel (D) 121.

FIG. 16 portrays another schematic diagram 122 showing channels A, B, C and D 124, and the signal processing used to combine and transmit the signals from FIGS. 13 and 15. The input signals are summed by a signal adder 126, and then added to a pilot frequency (100 kHz in this embodiment) 128. The signal is then multiplied by a 30 kilochip/second pseudorandom number code 130 resulting in a spread spectrum signal. An optional, unspread pilot frequency signal (100 kHZ in this embodiment) 132 may be added to ease the process of signal tracking at the point of the signals receipt. The complete signal has its level increased through an amplifier 134, and is then transmitted into the water via a hydrophone 136.

FIG. 17 is a graph 138 of signal strength 140 plotted against frequency 142 of the complete unspread signal. The complete unspread signal would correspond to point 143 in FIG. 16. FIG. 18 is a graph 144 of signal strength 146 plotted against frequency 148 of the complete signal after spreading. The complete signal after spreading would correspond to point 149 in FIG. 16.

FIG. 19 is a schematic diagram 150 of the signal processing required at the swimmer's headset to decode the received ultrasonic signal. The signal is received by the swimmer's hydrophone 150-1 and amplified by amplifier 150-2A. The signal is then split, one part is sent into a tracking processor 150-3 which implements any of various, known, tracking loops to match the frequency of signals and the received PN code. One output of the tracking processor is a duplicate 150-2B of the 30 kilochip/second pseudorandom number code with which the signal was spread at the transmitter. This is used to despread the signal (transform the signal from spread spectrum to normal) through a despreader 150-4. The other outputs of the tracking processor are frequency tones that match the center frequency of each of the modulated signal channels A, B, C and D in the composite received signal. These are used to produce baseband signals for each of the four channels through appropriate frequency shifts on the composite signal 150-5, 150-8, 150-10, 150-12. After frequency shifting to baseband the resulting signals are passed through appropriate low pass filters and demodulation processes 150-6, 150-9, 150-11, 150-13. The swimmer select channel A signal is then passed through a tone decoder and channel selector 150-7 which produces signals 150-15 which are used to select one (or more) of the audio channels. After processing the signal through an AND gates 150-16, 150-17 and 150-18, the selection signals with the different audio channels the final audio stream to a signal summer 150-14 is sent to the swimmer's earphones.

FIG. 20 supplies a schematic view 152 of the directions of magnetic flux relative to the forward and reverse 154 and 156 laps of the swimmer in the pool.

FIG. 21 presents another view 158 of the direction of magnetic flux relative to the forward progress of the swimmer for forward and reverse laps 160 and 162.

FIGS. 22, 23 and 24 offer representations of a Cartesian Coordinate System 166 that serves as a sensor frame; a depiction of gravity and magnetic flux vectors during a forward lap 168, and a depiction of gravity and magnetic flux vectors during a reverse lap 170.

Section Two:
Operation of Preferred & Alternative Embodiments of the Invention
Headset & Sensors One embodiment of the invention comprises a combination of hardware and software running that may include a system communication module 16, and a smart phone, tablet computer, personal computer or some other suitable information appliance 20. In one embodiment, a head set or other device 14 worn by a user 12 includes one or more real time performance sensors 42.

The present invention includes a combination of hardware and specially designed software that transforms the state of the device 14, and that produces information and communications capabilities that are not available to the user 12 without this combination of hardware and special purpose software.

The sensors 42 derive measurements of various performance metrics. The sensors 42 are worn on an athlete's body 12, and are linked by a wired or wireless connection 15 to the headset 14. The sensors 42 may include, but are not limited to:

Lap counter
Heart rate monitor
Respiration (breath rate) monitor
Stroke counter
Speedometer
Lap timer The sensors 42 provide data in digital electronic form to the headset 14 during the athletic activity.

In one embodiment, the headset 14 comprises a processor 22 and a non-volatile memory 24. Additional memory may be connected to the headset 14 for supplying generally continuous entertainment audio, such as music files, playlist, books on tape, workouts, etc. The processor 22 is capable of driving a set of headphones 14A, such as ear buds, inductive bone system, etc., that would provide audio to the athlete 12.

In one embodiment, the headset 14 is equipped with wireless communication capabilities for receiving data from the System communication module. These capabilities may include, but are not limited to, Bluetooth, IEEE 802.11 (Wi-Fi) and/or some other suitable wireless system. Alternative embodiments may also include multiple communication capabilities. For a swimmer 12, this would include an out-of-water communication method based on radio transmissions (such as Wi-Fi), and an in-water communication method. An alternative embodiment that uses ultrasonic frequencies through water is described below.

In one embodiment, the athlete's headset 14 is configured to to translate the digital data received from the real time performance sensors 42 into understandable audio. This feature is accomplished using commercially available text-to-speech algorithms or pre-recorded voice. Some examples of this audio would be:

Finished lap 10
Heart rate 92
Last lap time was 20 seconds
3 seconds behind target pace
3 seconds behind John's most recent pace System Communication Module The system communication module 16 provides a communication link 15 to the headset 14 as well as to applications running on a smart phone or computer 20 (coach's software, audio download software). For a swimming application, this module 16 communicates with smart phones via Wi-Fi or Bluetooth and communicates with the headset 14 using Wi-Fi (out-of-water communication) or ultrasonic underwater frequencies (in-water communication).

The system communication module 16 includes all the hardware that is necessary to provide these communication capabilities, as well as a small computer system to handle two different modes of communication:

First Mode: Before the athletic activity starts, the system communication module 16 transfers the entertainment audio stream files to the headset 14 via wireless (Wi-Fi) communication. It also transfers any activity instructions, e.g., "Change to backstroke on the next lap" that are required for the swimmer to the headset 14 over the same wireless link 15.

Second Mode: During the activity, the system communication module 16 sends any interrupt audio message to the headset 14. Examples of these interrupt audio messages may include voice messages from the coach 18, such as:

"You must pick up your pace," or
"That was good, but you're too fast, you will burn yourself out before you finish,"

These interrupt audio messages may also include information from the athlete's smart phone. The coach 18 is also able re-define or even define the workout during the activity.

During the activity, the system communication module 16 also receives data from the headset 14 when a communication link is available for such data transfer. This data comprises data accumulated from the sensors 42 by the headset 14. The system communication module stores and/or forwards this data to the coach 18.

In an alternative embodiment, the system communication module 16 provides the means for charging one or more headsets 14 when they are not being used. The headset charging is done inductively or through a wired connection.

Coach's Software

In one embodiment of the invention, the information appliance used by the coach runs a specially configured software application. This software application is used by a coach 18 in real-time as the athlete 12 is performing the activity. One of the functions of the software application is to provide the coach 18 with the ability to select an individual athlete to communicate with, and then to translate his/her voice to digital form and send it to the system communication module 16 for forwarding on to the particular athlete selected. The system will also have the ability to select subgroups (e.g., lanes) or all swimmers in the pool as recipients of an audio message.

Various other functions of this software include, but not be limited to, display of athletes picture, prior performance (in graphical or tabular form), the ability to add notes or voice memos to an athletes data profile, and/or receiving real-time performance information (lap count, speed).

After a given session, the software application uploads the performance results, coach's notes, and/or other information or data to a server. Such a server is connected to the internet (which may be referred to a "remote server" or "the cloud"), to a local network, or is a stand-alone computer. The server enables the sharing of data amongst teammates or others using the system (parents, friends, other athletes or coaches). The use of a server also allows coaches (or others) to define pre-packaged workouts (with or without music) for others to use, either as sellable content or as freeware.

Audio Download Software

A second software application that runs on a smart phone or computer is employed to send the entertainment audio data (in the form of computer files) to the system communication module 16 before the athletic activity starts, or during the athletic activity. The selection of what audio to send would be made through user choice either in real-time, or made at some previous time, e.g., at home, long before getting to the pool. The audio file is sent to the system communication module by the coach 18 or by the athlete 12, and the audio file can be sent to a specific headset 14, group of headsets or all headsets.

System Operational Modes

The present invention operates in two distinctive modes. The first mode, which includes two steps, is implemented prior to the beginning of the athletic activity beginning, as shown in FIG. 7.

Step One: Audio content is selected by the athlete, the coach, or a third party. The selection would be made through using the audio download software, and is done prior to the athlete getting to the pool (though it could also be done at poolside on a smart phone/tablet).

Step Two: The audio download software then communicates with the system communication module 1 and transfers the audio files, playing instructions and/or athletic activity instruction audio files through the module 16 and into the headset 14. This transfer can be either a point to point transmission (or series of point to point transmissions), targeted at an individual swimmer, or a point to multi-point transmission, in which one set of audio files are downloaded for all the swimmers on a given day. The system communication module 16 then duplicates the data, and downloads it to each headset 14. This download takes place before the athletic activity, and, as an alternative, before the swimmer actually gets into the pool. This process need not be simultaneous for each headset 14. The system communication module 16 coordinates the transmission of data to each headset as it becomes available.

The second mode, which includes five steps, is implemented during the athletic activity, as shown in FIG. 8.

Step One. As the athlete 12 performs the activity, the headset 14 plays the entertainment audio stream generally continuously, which allows, for example, the swimmer to hear music while swimming his/her laps.

Step Two. At regular intervals, or when certain events occur (like finishing a lap), the headset 14 will transform some or all of the digital data received from the real time performance sensors 42, and then delivers it in audio form to the athlete 12. For example, after every lap in the pool, the swimmer 12 could hear the lap count e.g., "Finished lap X". During play of the performance audio, the entertainment audio stream is paused, and then resumes after the performance data had been spoken.

Step Three. If there are athletic activity instructions, they are provided when triggered (e.g., by time, lap count, distance). The audio stream is provided by the headset 14 as appropriate. The audio stream also causes the entertainment audio stream to be paused while it is delivered. An example of such an audio stream could be instructions like: "Switch to the backstroke on the next lap."

Step Four. When the coach 18 wants to communicate with an athlete 12, the coach selects a particular athlete to target using the coach's software. The coach then speaks into his or her smart phone or tablet's microphone 93A, 93B 93C. The resulting digitized voice stream is sent by the coach's software, along with identification of the targeted athlete 12, to the system communication module 16. The module 16 then sends it on to the correct headset 14 through the appropriate means (for a swimmer this would be modulated ultrasonic audio propagated, through the water). When received by the headset 14, this interrupt audio would be immediately delivered to the athlete 12. The entertainment audio stream is then paused. Any performance data delivery is then delayed or discarded. Activity instruction audio is delayed if it is interrupted/interdicted by the interrupt audio.

Step Five. When the headset 14 is out of the water (for example, during a rest period between laps or after a set of laps), recorded performance data from the attached sensors 42 is sent back to the system communication module 16 for archiving and is then relayed to the coach's information appliance. In addition, at this time, new athletic activity instructions and/or audio is downloaded to the individual headset 14 from the system communication module 16, as shown in FIGS. 9 and 10.

Real Time Audio Selection

In one embodiment of the invention, the headset 14 is programmed with software algorithms that are stored in the non-volatile memory 24, and that handle the various audio streams that are available for simultaneous delivery to the athlete 12. FIG. 11 is a flowchart of the decision making process for this particular embodiment of the software.

At decision point 62A, the system plays the entertainment audio stream if there is no other audio ready to play.

At decision point 62B, the system determines if the non-entertainment audio is interrupt audio (coach's voice). If it is, it will be played as the highest priority, and will continue to be played until it terminates/ends. When it ends, the system will check if other non-entertainment audio is ready or has been delayed (in the case of activity instructions).

At decision point 62C, the system plays activity instructions in preference to performance data.

At decision point 62D, the system provides performance data as the lowest priority audio stream. If there is no performance data to provide, the system will go back to playing the previously paused entertainment audio.

A Web Portal

One embodiment of the invention includes a web portal for distributing workouts in a defined format. The web portal enables coaches to sell or to distribute their workouts (e.g., a triathlon training schedule). The web portal not only distributes the workouts, but also gives the coach 18 and the athlete 12 access to the performance data for all workouts recorded with the system and any swim meet results.

Communication from Swimmers

In another alternative embodiment, a microphone is built into the headset to allow the athlete to communicate with the coach. The microphone would enable the swimmer to send audio (speech) over the wireless link 15 to the system communication module 16. The audio data is saved (verbal commentary) and/or transmitted to the coach and/or transmitted to other athletes.

Section Three:

Underwater Ultrasound Communication System

One embodiment of the invention comprises a one-way underwater communication system designed for audio messages, such as speech or music, transmitted to swimmers in a pool from a poolside location. Although a specific embodiment is described below, persons having ordinary skill in the art will appreciate that many design variations may be employed to implement the invention. These variations include, but are not limited to, different frequency bands, numbers of channels, bandwidths, channel selection logic and/or other design configurations.

As shown in FIGS. 12 through 19, one embodiment propagates four broadcast channels labeled A, B, C, and D. These channels occupy separate sub-frequency bands, although other embodiments could use fewer or more channels. In this embodiment, transmissions over the four channels occur generally simultaneously. Channel A only transmits tones used for selecting individual swimmers to receive messages from either or both of two swim coaches, or to broadcast announcements to all swimmers. The coaches talk over channels B and C. Channel D is a default channel (which might contain music) heard by a swimmer when he is not hearing from a coach. However, a specific tonal frequency f0 sent on channel A enables an interrupting announcement on channel D that all swimmers will simultaneously receive. As shown in FIG. 13, either coach can send tonal frequency f0, but other conditions (such as an emergency) could cause f0 to be transmitted.

The individual swimmers are identified by the numbers 1, 2 . . . N; and each wears an ultrasound receiver with earpieces for hearing. Each coach has a transmitting apparatus connected either by wires or wireless means to a common transmitting hydrophone immersed in the pool. The first coach 18 always talks over channel B, and the second coach 46 always talks over channel C. The selection of an individual swimmer to hear a message from a coach is accomplished by sending a tone of a specific frequency over channel A. For example, if first coach 18 wants to talk to swimmer #3 (but to no others), tone frequency f3 is transmitted on channel A, as shown in FIG. 14. The reception of this tone enables that swimmer to hear first coach 18 talking on channel B. On the other hand, if second coach 46 wants to talk to swimmer #3, tone frequency fN+3 is transmitted on channel A, enabling swimmer #3 to hear coach 46 talking on channel C.

The coaches 18 & 46 can talk to more than one swimmer at a time by simultaneously sending more than one tone over channel A. For example, if first coach 18 simultaneously sends tone frequencies f3, f5, and f7 over channel A, swimmers #3, #5, and #7 can hear the first coach 18 talking over channel B. One or more swimmers can also to hear both coaches 18 & 46 at the same time. For example, if on channel A first coach 18 sends tone frequencies f2 and f6 and second coach 46 sends tone frequencies fN+2 and fN+6, swimmers #2 and #6 will be able to hear both coaches 18 & 46 talking.

Transmitter Design

FIG. 12 shows channels A, B, C, and D in frequency sub-bands respectively centered at 100 KHz, 150 KHz, 200 KHz, and 250 KHz, although other center frequencies may be employed in alternative embodiments. These sub-bands are shown prior to spectral spreading by a PN code that is described below.

FIG. 13 shows how the selection tones in Channel A are multiplied by a 100 KHz carrier, which shifts them to a spectrum having a 100 KHz center frequency.

FIG. 14 shows the frequency layout of the selection tones in more detail. For N=12 swimmers, a total of 25 tones would be needed. The lowest tonal frequency f0 needs to be high enough to avoid confusion with a pilot #1 frequency, which is described below. In this embodiment, f0 is 1 KHz. If the tones have 100 Hz spacing, the channel A bandwidth using amplitude modulation would only be about 6800 Hz, while still allowing enough separation for each tone to be easily identified by a swimmers receiver.

FIG. 15 shows the generation of (as yet unspread) channels B, C, and D. The speech 94 channels B and C are limited by low-pass filtering to 3 KHz, which still permits clear speech intelligibility. Channel D has a larger bandwidth of 10 KHz for better music fidelity. The speech 94, 104 on channels B and C modulate carriers with respective frequencies of 150 KHz and 200 KHz, and the audio on channel D modulates a 250 KHz carrier. Several types of modulation could be used, such as AM (amplitude modulation), DSB (double sideband modulation), SSB (single sideband modulation), FM (frequency modulation), or others. In this embodiment, AM is assumed since it is the simplest to demodulate in a receiver.

FIG. 16 shows how the transmitted signal is formed. The unspread signals 124 in Channels A, B, C, and D are summed in adder 126 to form a single signal to which is added a 100 KHz pilot carrier 128, called pilot #1. The composite signal is then multiplied by a 30 kchip/sec PN code 130 to form a spread-spectrum signal. The primary purpose of the PN code is to mitigate multipath, which is described in greater detail below. In another embodiment, a second 100 KHz pilot carrier 132, called pilot #2, is added to the spread signal. Because pilot #2 is not spread, it may easily be detected and its Doppler shift (due to swimmer motion) is used to facilitate code and carrier acquisition in the swimmer's receiver. After amplification in amplifier 134, the signal is transmitted by a hydrophone 136 with a wide radiation pattern to cover the pool underwater as uniformly as possible.

FIG. 17 shows the spectrum of the signal 143 in FIG. 16 prior to spreading, including the 100 KHz pilot #1 carrier described above.

FIG. 18 shows the spread-spectrum signal 149 in FIG. 16, plus the optional unspread 100 KHz pilot #2 carrier.

Receiver Design

A schematic block diagram of one embodiment of a swimmer's receiver is shown in FIG. 19. The received signal is picked up by an omnidirectional hydrophone, and is then amplified. The PN code and 100 KHz pilot #1 carrier are acquired and tracked within the block at the bottom of FIG. 19. If the optional unspread 100 KHz pilot #2 carrier has been transmitted, the first step in acquisition is to detect it and measure its frequency to eliminate the need for frequency search during acquisition. The tracker is designed to track the received PN code replica which arrives first, and not later replicas that might arrive via multipath propagation.

After acquisition, the tracker generates the same PN code as that which was transmitted, but which has been compensated for Doppler shift due to swimmer motion, and is aligned with the direct-path received PN code. The received signal is multiplied by the tracking PN code, which despreads all four received channels. By also tracking the despread 100 KHz pilot #1 carrier, the tracker generates Doppler-compensated frequencies, nominally 100, 150, 200, and 250 KHz, which are used to shift each of the four channels to baseband using complex frequency shifters as shown In the figure. Each baseband channel is lowpass filtered and AM demodulated. The lowpass filter for baseband channel A is made just wide enough to pass all received tones. The channel B and C lowpass filters have a 3 KHz cutoff to pass speech but not higher frequencies. The lowpass filter for channel D has a 10 KHz cutoff to pass music with reasonably good fidelity.

The received selection tones from baseband channel A are fed to a tone decoder, the output of which selects which of the baseband channels B, C, and/or D are to be heard by the swimmer. The specific tone frequencies which enable channels B and C to be heard are unique to the individual swimmers receiver, while the tone frequency f0 which forces and announcement on channel D to be heard is common to all receivers.

In one embodiment, an automatic gain control (AGC) is included in the receiver. Because underwater ultrasound attenuation has a rather severe frequency dependence, in one embodiment, each of the four channels includes an independent AGC circuit.

PN Code Characteristics

The 30 kchip/sec PN code is a shift-register generated maximal length PN sequence of length where N is a positive integer equal to the length of the shift register. The shift register feedback configurations for various values of N are well-known in the art. The normalized autocorrelation function for such a PN sequence has a peak of value $-1/(2^N-1)$ for no chip shift and a constant value of for all shifts greater than 1 chip in magnitude. For a suggested value of N=10, the code consists of a 1023-chip sequence having a repetition period of 0.0341 seconds and a spatial period of 49.8 meters in water. The spatial length of one chip is 4.87 cm. Thus, on each of the 4 channels, any multipath signal with a spatial delay between 4.87 cm and about 49.8 meters relative to the direct path signal will be significantly attenuated. The amount of attenuation increases with the chip rate of the PN code and higher chipping rates may be used if needed.

Digital Implementation

One embodiment of the present invention is configured to achieve low-cost digital implementations of both the transmitter and receiver. Required sampling rates are quite low, digital implementation of the required lowpass filter designs is not very demanding, and arithmetic operations is relatively simple to implement with a microprocessor and/or dedicated chip, including those needed for code/carrier tracking and the tone decoder in the receiver.

All frequencies generated within the transmitter or receiver are relatively low and are easily synthesized from a single oscillator. The oscillator frequency tolerance is not demanding.

Design Tradeoffs

In an alternative embodiment of the invention, the four channel center frequencies could be closer together than described in the previous embodiment, as long as the space between the unspread channel spectra is large enough to allow channel isolation by the lowpass filtering in the receiver. For example, the center frequencies for channels A-D might respectively be 100, 120, 140, and 160 KHz. This reduces the required bandwidth of the transmit and receive hydrophones, probably making them less costly. This also reduces the variation of ultrasound attenuation in the water over the signal bandwidth. These center frequencies cause greater overlap of the spread spectra of the transmitted channels. However, this presents no problems inasmuch as the despreading process in the receiver removes the overlap.

By using SSB modulation instead of AM on each channel, channel bandwidths may be halved, permitting even closer channel spacing and a yet smaller required hydrophone bandwidth. However, SSB modulation/demodulation adds complexity to the system design.

The generation and decoding of selection tones may be made simpler by having at most two tones simultaneously transmitted by a coach. One tone identifies the individual swimmer, and the other identifies the coach, enabling the identified swimmer to hear the identified coach. This embodiment also offers the capability of transmitting a special tone of frequency f0 for an announcement to all swimmers.

If desired, stereo could be transmitted on channel D using I and Q for left and right.

Section Four:

Alternate Embodiments of the Underwater Ultrasound Communication System

In another embodiment of the Underwater Ultrasound Communication System, all four channels are transmitted at the same frequency (for example, 100 kHz) and signals are frequency-spread on the channels using a unique PN code for each channel. At a swimmer's receiver, the signal from an individual channel is recovered by correlation using its PN code as a reference. At the output of the correlator for a given channel, the signals from the other channels appear as wideband noise, most of which are removed by a filter with a bandwidth just large enough to pass the de-spread speech or music information for the given channel.

The selection of a swimmer for communication from either coach is accomplished in the same manner as the original embodiment described above. Also, the optional unspread pilot tone #2 shown in FIG. 18 can still be transmitted as an aid to acquiring and tracking the received signals on all channels.

For increased reliability in selecting swimmers for communication, each coach 18 and coach 46 swimmer select tone can be replaced with a dual tone using multi-frequency (DTMF) technology, similar to that used in touch-tone telephones. Keypads for producing 10 DTMF signals have low cost and are widely available for telephone use. Any modifications needed to permit each coach to independently select up to ten swimmers should be relatively simple. If necessary, pressing two keys on a DTMF keypad could further expand the number of selectable swimmers.

Section Five:

Magnetic Lap Counter

One embodiment of the invention includes a system for automatic counting of laps for a swimmer through the use of magnetic sensors. Although a specific embodiment for swimmers is described, such a device could be used for any exercise/sport that consists of back and forth movement (such as running laps on an oval track).

General Description

As shown in FIGS. 20 and 21, the magnetic field (shown as magnetic flux lines) of the Earth is constant across the pool, regardless of the direction of motion of the swimmer shown in FIG. 20. When viewed from the point of view of the swimmer (in the swimmer's "body frame"), these flux lines reverse direction when the swimmer switches from the forward to the reverse lap (bottom panel) or from the reverse to the forward lap. These field reversals are sensed to calculate a count of laps swum.

Hardware Sensor Design

One embodiment of the invention includes a set of three magnetic sensors in an orthogonal configuration ("3 axis magnetic sensor") and a set of three acceleration sensors in an orthogonal configuration ("3 axis accelerometers"). The two sets of sensors are constructed and connected such that the rotational relationship between them is a known, fixed quantity. This configuration allows measurements made by the magnetic sensors to be referenced to measurements made by the accelerometers. In this embodiment, the sensors have identical alignments as shown in FIGS. 22, 23 and 24. The vector measurement from one sensor frame can be converted into the other sensor frame through a constant rotation matrix.

$$V^M = \Omega^M_A V^A$$

Where VM is the vector in the magnetic sensor frame, VA the vector in the accelerometer sensor frame and $\Omega^M_A$ is the rotation matrix between the two frames.

Basic Measurement Processing

Measurements obtained from the sensors are processed in a low cost/low power microprocessor (or other computing device, such as the headset microprocessor). The accelerometers feel the pull of gravity, and detect a 9.8 m/s/s acceleration "down" towards the center of the Earth (along the "Y" axis in FIGS. 22, 23 and 24). Vertical and horizontal components of the magnetic flux direction are separated using the expression:

$$H^M = V^M - V^G(V^M V^G)$$

Where $V^M$ is the measured (3 axis) magnetic vector, $V^G$ is a unit vector in the direction of measured gravity and $H^M$ is the horizontal component of the magnetic vector. When the sign of $H^M$ changes, a "lap" will be counted. FIGS. 22, 23 and 24 show an example where the measurements happen to line up with different axis of the sensors.

Stroke and Body Orientation Changes

In this embodiment, the accelerometers are used to determine if the swimmer has changed "stroke" between laps. Specifically, if the swimmer transitions between a face down swimming style (like breast stroke) to a face up swimming style (like back stroke) the sensor suite will undergo a 180 degree rotation. This is detected by the change in sign of the gravity vector measured by the accelerometers. In the sensor frame (body frame of the swimmer), the gravity vector will switch from pointing "down" to pointing "up" (caused by the sensor suite flipping over). When detected, this is compensated.

Measurement Filtering

In this embodiment, the sensors are attached to the swimmer's body, so they undergo motions related to the swimmer's movements. These motions will be dependent on the actual location of the device on the swimmer's body (for example; motion of the head will be different than motion of the hips). This body motion will be removed from the measurements through appropriate (and standard) mathematical filtering techniques (such as box car averaging, continuous averaging, alpha-beta filters, etc.). The actual filtering algorithms and parameters may vary depending upon placement of the system.

The algorithms that are used for filtering are fixed, or selected, based on attachment position of the system. Or, they can be determined through analysis of the sensor system's motion via the accelerometer readings. Profiles for expected acceleration patterns based on attachment position (head, waist, hips, wrist, etc.) are stored and matched to actual sensor readings. Once the attachment position is determined, the appropriate filtering algorithms can be used to process the measurements for lap counting.

Design Tradeoffs

This embodiment uses three axes of magnetic sensors and three axes of acceleration sensors. Alternative embodiments may employ fewer sensors by restricting the alignment/placement of the system on the athlete. The minimum configuration would include only a single magnetic sensor and no acceleration sensors. Other configurations are also possible. The acceleration sensors provide data that could be processed for other purposes. Such as (but not limited to):

Speed profile during the lap.

Time of "turnover" at the transition from one lap to another.

"Push off" acceleration/force during "turnover"

Section Six:

Method of Making Motion Pictures Under Water

FIG. 25 presents a schematic of one embodiment of the invention. A Crew member 172 using a computing device 174 communicates over a wireless link 15 with a film system communication module 176 placed nearby a filming tank 178. The computing device 174 can be a Smartphone, Tablet or computer. A crew member 180 and/or talent 182 wearing a remote transceiver 184 in the tank communicates over a wireless link 58 through the film system communication module. Additional crew members 186 can also connect to the film system communication module 176 and communicate to any person with a transceiver 184. In an alternative embodiment of the invention, the wearer of the transceiver may be in different filming environments. In this specification and the claims that follow, the term "wireless link" is intended to encompass any transmission of data information or content between or among a number of mobile transceivers. The wireless link is bi-directional and may be propagated as one or more Wi-Fi, WiMax, Bluetooth, cellular, radio frequency, ultrasonic signals, or any other suitable emanation that connects the user of the head mounted transceiver 184 with one or more other persons or terminals. In alternative embodiments, the user may wear a different but generally equivalent device that functions like the head mounted transceiver. For example, it may be inconspicuously attached to the torso. In another embodiment, the transceiver may be configured so that its functions are physically separated into different modules such as external battery and processor on a belt, earpiece in the ear and microphone in mask.

FIG. 26 is an illustration of how communication through the film system communication can take place. One or more crew members 172, 186 and 188 can simultaneously be communicating wirelessly to the Film System Communication module via a Computing device 174. Based on input form the crew member, communication can then be delivered to a single individual 190 or a groups of individuals 192 and 194.

FIG. 27 depicts how a crew member can communicate a single message to all persons 195 connected to the Film System Communication module 176.

FIG. 28 is an illustration of a configuration of three film system communication modules 176 that when operated together can determine the Cartesian coordinates of any person 180 and 182 in the filming tank wearing a transceiver 184. In this embodiment, wireless ranging signals 185 from the film communication modules 176 can be used to determine range data to each transceiver in the filming tank.

FIG. 29 is a block diagram of the parts of the invention. The computing device 174 will run three main software modules. The user 172 will use communication user interface 202 to select the person or persons to transmit messages to. The content user interface 204 displays relevant content for the person or persons that the user is communicating with. The user 172 may view different information including but not limited to script lines, lighting instructions and photography instructions. The virtual perspective viewer 206 will if connected to a setup as illustrated in FIG. 28 display a three dimensional representation of the talent and crew in the pool. Using this information the user 172 can on the computing device 174 simulate movement of the persons wearing the transceiver 184 and generate a perspective from the point of you of the camera operator from simulated positions. The transceiver will then be able to autonomously generate precise instructions to persons wearing the transceiver, for example "move 1 ft up and 2 ft left". The position determination circuit 208 in the Film System communication module 176 will based on ranging data to each transceiver 184 from at least three Film communication modules 176 determine the Cartesian coordinates of each individual transceiver and its user. The communication circuit 210 manages the connections to and the delivery of speech and data to the transceivers connected to the Film system communication module based on input from the communication user interface 202. The Cloud back-end 200 imports, stores and manages data from third party software, such as production management software 218. Upon commencing a project with the system, through the data import/export module 212, the user(s) could import information such as crew/talent names and photos, script, lighting instructions and any other available digital information that is available for the project. At the end of a filming project any digital information added to the project can be exported from the cloud back-end 200. The dBase 214 stores data associated with projects such as crew and talent data as well as any data that is imported from 3$^{rd}$ party software, such as production planning software. The remote access module 216 facilitates data transfer between the film communication system and a remote video conferencing system such as Skype. For example, when connecting to the system via the remote access module, the Director of photography could verbally instruct the cameraman from a remote location with internet access. Any remote team member could connect to anyone with a transceiver on the film set.

FIG. 30 represents one element of the film application user interface resident on Smartphone, tablet or computing device 174. The user of the application can transition between screens on the chosen device, for example swiping 230 on tablet and smartphone. The user interface wraps meaning that when the user reaches the last screen of crew or cast members continuing to swipe in the same direction will bring up the first screen which will always be the screen with the entire set. The screen with the entire set 220 includes everyone on the set that is connected to a transceiver. The user can scroll up and down the list by swiping up and down by touch 222. The square 224 for each crew/cast member will include a picture of the person and his or her job function or role. The scene being filmed is identified on square 226. Pressing this will bring up a summary of the scene, only designated individuals for example the Director or Producer will have the ability to transition to the next scene. Pressing the 'Talk Set' area 228 on the screen opens a communication channel to all transceivers connected to the film communication module. The cast #1 screen 232 includes the cast members defined to belong to that group. The scene square 226 operates like on the entire set screen. Pressing the Talk Cast #1 square 234 opens a communication to just those individuals included in this group. Screen 236 operates in the same manner as 232 except that in this case the sub-group is the Grip crew. Screen 238 is to illustrate that additional screens of sub-groups wearing transceivers on the set can be accommodated. The individual cast or crew member can be accessed from the Entire Set screen 220 or a subgroup cast or crew screen 232.

FIG. 31 is an illustration of the method for selecting a specific individual on the set to communicate to. By pressing on square 224 of a specific cast or crew member, the software will display a screen 242 specific to that individual, in this case the Key grip. This page will contain information on the crew or cast member as well as specific information pertaining to this individual such as setup instructions or lines for a cast member for example. Pressing the Talk 1:1 244 opens a private communication channel to the individual, in this case the Key Grip.

FIG. 32 illustrates how sub-groups of the crew and cast can be defined. In this case the Grip sub-group 236 is being defined. Screen 236 will only include the individuals associated with the group and will always have an add crew square at the end of the list. Pressing the add crew square 246 brings up screen 248 which includes all crew and cast. The list is scrollable 222 and a highlighted individual will have an add to crew or cast sub-group square 250, in this case the Grip sub-group.

FIG. 33 illustrates how a new cast or crew member can be added to the entire population of cast and crew members. Add user is an option on the select staff screen 248. On selecting the add user option on screen 248, Add user screen 252 will appear. Pressing square 254 will switch to the computing device 174 camera or photo library to take or select a picture of the specific user. Selecting the Link Comm. Unit square 256 will switch to the scan function of the smartphone, tablet or computing device 174 to scan the serial number of the transceiver. If scanning is not possible the user can press the manual square 258 which will bring up screen 260 where the serial number can be manually entered. Screen 260 is also displayed when a unit is successfully scanned. On screen 252 the first and last name of the user can also be entered and the crew or talent group can also be selected.

FIG. 34 illustrates a two-way communication setup which in addition to the functions described for transceiver 184 also includes the ability to transmit live verbal communication to other users connected to the film communication module. The modules added to transceiver 184 is a transmit module 262 which includes and amplifier, processor, memory and a hydrophone. A microphone 264 will pick up voice communication which will then be configured for transmission by the transmit module. When used under water this microphone will have to be placed in a full face dive mask. Wireless signals from the film communication module are received by headset 184 and transmitted to the film system communication module by transmit module 262.

FIG. 35 is an illustration of how a user can simulate different camera perspectives using the software. By using the position data computed as described under FIG. 28, the software can simulate the view from any camera angle. In this illustration the perspective of cast members 172 is simulated at 4 different angles. In this case view 265 and 266 are presented.

FIG. 36 is an illustration of the transceiver without the microphone and transmit module. This transceiver will be able to receive voice communication only, it is not capable of transmitting voice back to the film system communication module.

FIG. 37 is a block diagram of the software resident on the smartphone, tablet or computing device. Software module 202, 204, 206 were described under the description of FIG. 29. The audio communication channel management software module 203 manages the channeling of voice communication from the crew outside of the filming tank to specific crew and talent in the filming tank. The System communication interface module 205 manages the interface to the film system communication module. The cloud back-end server interface module manages the communication 207 to and from the cloud back end where retrieving scene specific data, synchronizing crew and talent information and any other information on the cloud back-end database.

FIG. 38 is a block diagram of the Production Management software. This software will reside on the cloud back-end server, is used to manage the film project by scene for presentation on the software resident on the smartphone, tablet or computing device described under FIG. 37. Crew members can be assigned by scene 270. Talent can be assigned by scene 272. Script breakdown by scene 274 breaks down the script by scene and assigns it to the talent by scene. Any soundtrack files can be assigned to the scene for playback underwater during the underwater filming, this is managed by software module 276. Story boards or any other images can be assigned by scene using software module 278. Finally, scene specific tasks for the crew such as lighting can be defined and assigned by software module 280.

Section Seven:
Operation of Preferred & Alternative Embodiments for Making a Motion Picture Under Water
Headset Transceiver One embodiment of the invention comprises a combination of hardware and software running that may include a film communication module 176, and smart phone, tablet computer, personal computer or some other suitable information appliance 174.

The present invention includes a combination of hardware and software that transforms the state of the device 184, and that produces information and communication capabilities that are not available to user 180 without this combination of hardware and special purpose software.

In one embodiment, the headset 184 comprises a processor 36 and a non-volatile memory 38 for supplying the background soundtrack for a particular scene or sequence such as music files. The processor is capable of driving a set of headphones 14A, such as ear buds, inductive bone system etc., that would provide audio to the user 180.

In one embodiment, the headset 184 is equipped with wireless communication capabilities for receiving data from the film communication module 176. These capabilities may include but are not limited to, Bluetooth, IEEE 802.11 (Wi-Fi) and/or some other suitable wireless system. Alternative embodiments may also include multiple communication capabilities. For a user 180, this would include an out-of-water communication method based on radio transmissions (such as Wi-Fi), and an in-water communication method. An alternative embodiment that uses ultrasonic frequencies through water is described below.

In another embodiment, the headset 184 is coupled with a transmit module 262 and a microphone 264. The transmit module transmits audio from the microphone back to the film communication module that is then in turn transmitted back to the smartphone 174.

Film Communication Module

The film communication module 176 provides a communication link 15 to the headset 184 as well as to applications running on a smartphone or computer 174 (director software). For a filming application, this module 176 communicates with smartphones via Wi-Fi or Bluetooth and communicates with the headset 184 using Wi-Fi (out of water communication) or ultrasonic underwater frequencies (in-water communication).

In one embodiment the film communication module can determine the position the transceivers in the filming tank by using ranging signals transmitted and measured by the film communication module.

Director's Software

In one embodiment of the invention, the information appliance used by the director or anyone else directing activity on the set (e.g. lighting director). This software application is used by a crew member 172 as the cast and crew are in the filming tank. One of the functions of the software application is provide the crew 172 with the ability to select an individual cast or crew member to communicate with, and then translate his/her voice to digital form and send it to the film system communication module 176 for forwarding to the particular cast or crew member. The crew member will also have the ability to select a sub-group of crew or cast in the tank or indeed the entire crew or cast connected to the film communication module.

Various other functions of this software include, but not limited to, display of actor/crew picture, specific instructions for the particular cast or crew member for the current scene. The scene specific instructions can be imported from Production management software via the Cloud back-end described below.

Cloud Back-End

In one embodiment of the invention, the film communication system and information appliance will have access to a cloud back-end server. The cloud back-end server includes a database 214 that stores all information specific to a defined project which may include, but not limited to, scene specific instructions, film sound track and crew and cast data. The cloud back-end server includes a data import/export module for importing project specific information from Production Management software. The cloud back-end also includes software to connect to staff remotely via video conference software, various functions of this software include, but not limited to, transmission of live images from the film set and the ability to speak directly to crew or cast as if he/she were on the set using a smartphone or computer 174.

Virtual Perspective Viewer

Using position data for the headsets from the Position Determination circuit the software application running on 174 will be able to simulate view of cameras positions for the benefit of the Director, Second Unit Director or anyone else needing this information.

Section Eight:

One Particular Embodiment of the Invention

One embodiment of the present invention includes a film system communication module, which includes a processor and a memory. The film system communication module is configured to transmit and to receive ultrasonic signals that penetrate water.

The invention also includes one or more mobile transceivers which may be used members of a film-making or production crew. These mobile transceivers are configured to communicate with the film system communication module. In one embodiment, some of the mobile transceivers may be smart phones, laptops, tablets or any other suitable device.

One embodiment of the invention is implemented in a volume of water, such a filming tank which is designed for the production of a motion picture. During production, some of the members of the film-making crew, including the actors, are partially or fully immersed under the surface of the water.

In one embodiment, some of the mobile transceivers are underwater headsets which are configured to transmit and/or to receive ultrasonic signals through water.

In one implementation of the invention, the film communication module is configured to emit and/or to receive a ranging signal for determining the position of one or more of the members of the film-making crew under water.

The invention may also utilize a back-end server, which includes a processor and a memory. The back-end server is connected to the film system communication module and stores digital content concerning the production of a motion picture; and provides data and digital content to a remote requestor or user over a network.

In one embodiment, the invention includes a software App that is run on each of the transceivers to provide a display showing some of the members of the film-making crew, their job functions and other pertinent information. The software App also provides an interface for a director of the motion picture to receive data and communications, and to issue instructions to the members of the film-making crew.

In one embodiment of the invention:

the film system communication module is configured to communicate both audio and video signals;

the underwater headsets communicate using an ultrasonic frequency or some other suitable water-penetrating band;

the underwater headsets each include a sensor for communicating position information to the film system communication module;

the underwater headsets each include a microphone and a headphone;

the software App provides members of the film-making crew with the ability to select a particular member of the film-making crew for communications;

the software App enables members of the film-making crew to select a sub-group of the film making crew for communications;

the software App generates a display of the film-making crew together with their corresponding instructions for a particular scene in the motion picture;

a production management software program which runs on the back-end server;

the software App enables specific instructions for a particular scene to be imported from the production management software running on the back-end server;

a database which is stored in said memory of the back-end server; the information is specific to a particular motion picture production;

the film system communication module uses the position data from the under water headsets to simulate a view of camera positions; and the under water headsets are configured to guide said members of the film-making crew to positions under water.

SCOPE OF THE CLAIMS

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a System for Making Motion Pictures Under Water that have been disclosed above are intended to educate the reader about preferred embodiments of the invention, and are not intended to constrain the limits of the invention or the scope of Claims.

LIST OF REFERENCE CHARACTERS

10 One embodiment of Activity Monitoring and Directing System
12 User or athlete
14 Headset
14A Headphones
15 Wireless link
16 System communication module
18 First coach
20 Smart phone or other information appliance
21 Swimmer in the water
22 Processor
24 Non-volatile memory
26 Cyclist and coach
27 Bicycle
28 Athlete module
30 Schematic block diagram of headset
32 Transceiver
34 Antenna
36 Processor
38 Non-volatile memory
40 Power source
42 Sensors including accelerometers
44 Two coaches and system communication module
46 Second coach
48 Second smartphone or other information appliance
50 Detailed schematic block diagram of system communication module
42 Loading audio stream before activity
54 iPhone™ or computer with audio files
56 Communication during activity, while swimming
58 Ultrasonic link
59 Communication during activity, while resting
60 Communication during activity, while resting
62 Flowchart
62A First decision point
62B Second decision point
62C Third decision point
62D Fourth decision point
64 Spectrum use
66 Signal strength
68 Frequency
70 Schematic diagram of circuitry
72 First swimmer selector frequency
73 Second swimmer selector frequency
74 First tone generator
75 Second tone generator
76 Signal adder
78 Reference frequency
80 Unspread Signal A
82 Graph of spectrum use
83 Signal strength
84 Announcement tone
86 Frequency
88 First coach swimmer select tones
90 Second coach swimmer select tones
92 Schematic diagram of circuitry
93 Microphones
94 Coach 18 voice
96 Amplifier
98 3 KHz LPF
100 Modulator
102 Unspread Channel B
104 Coach 46 voice
106 Amplifier
108 3 KHz LPF
110 Modulator
112 Unspread Channel C
114 Music or announcements
116 Amplifier
118 10 KHz LPF
120 Modulator
121 Unspread Channel D
122 Schematic diagram
124 Channels
126 Signal adder
128 100 KHz Pilot No. 1
130 30 kchip/sec spreading PN code
132 100 KHz Pilot No. 2
134 Amplifier
136 Transmit hydrophone
138 Frequency use
140 Signal strength
142 Frequency
143 Complete unspread signal
144 Frequency use
146 Signal strength
148 Frequency
149 Complete signal after spreading
150 Schematic diagram
150-1 Swimmer hydrophone
150-2A 30 kchip/sec tracking PN code
150-3 Code & pilot #1 tracker
150-4 Despreader
150-5 Frequency shift
150-6 LPF & demodulation
150-7 Tone decoder for channel selection
150-8 Frequency shift
150-9 LPF & demodulation
150-10 Frequency shift
150-11 LPF & demodulation
150-12 Frequency shift
150-13 LPF & demodulation
150-14 Adder
152 Magnetic flux during laps in pool-pool frame
154 Direction of magnetic flux during forward lap
156 Direction of magnetic flux during reverse lap
158 Magnetic flux during laps in pool-body frame
160 Direction of magnetic flux during forward lap
162 Direction of magnetic flux during reverse lap
164 Gravity and magnetic flux vectors
166 X,Y,Z sensor frame
168 Gravity and magnetic flux vectors on forward lap
170 Gravity and magnetic flux vectors on reverse lap
172 User (crew)
174 Smartphone or other information appliance 176 Film system communication module
180 Crew in filming tank
182 Talent in filming tank
184 Transceiver
185 Ranging signal
186 User (crew) two
188 User (crew) three
190 User (talent)
192 User group (crew) four
194 User group (crew) five
195 Entire user group attached to system
200 Cloud back-end
202 Communication user interface software module
203 Audio communication channel management
204 Content user interface software module
205 System communication interface module
206 Virtual perspective viewer software module
207 Cloud back-end server interface module
208 Position determination module
210 Communication circuit
212 Data import/export software module
214 Database
216 Remote access software module
218 Production management software
220 User interface screen of the entire set
222 User action to scroll up and down the screen
224 User interface square of individual user connected to the system
225 User interface action (tap) to select crew or cast member screen
226 User interface square to access screen with information on the current scene
228 User interface square to open communication to the entire set
230 User action to swipe between screens
232 User interface screen of a sub-group of the cast/talent
234 User interface tile to open communication to a sub-group of the cast
236 User interface screen of the grip section of the crew
238 Illustration of additional screens the can be added to the loop
242 User interface screen of individual user
244 User interface square to talk 1:1 to an individual cast or crew member
246 User interface square to add crew or talent
248 User interface screen to select staff (crew or talent)
250 User interface square that adds selected crew or talent to sub-group, in this case Grip group
252 User interface screen to add user
254 User interface square to set picture of user
256 User interface square to link transceiver to user
258 User interface square to manually link transceiver to user
260 User interface to confirm serial number of linked transceiver
262 Transmit module including hydrophone
264 Microphone
265 Simulated camera position one
266 Simulated camera position two
268 Smartphone/Tablet or Computing device software
270 Crew member assignment by scene software module
272 Talent assignment by scene software module
274 Script breakdown by scene software module
276 Soundtrack breakdown by scene software module
278 Story board breakdown by scene software module
280 Scene specific task definition and assignment software

SEQUENCE LISTING

Not applicable.

What is claimed is:

1. An apparatus comprising:
a film system communication module; said film system communication module including a processor and a memory; said film system communication module being configured to transmit and to receive ultrasonic signals that penetrate water;
a plurality of mobile transceivers; said plurality of mobile transceivers being used by a plurality of members of a film-making crew; said plurality of mobile transceivers being configured to communicate with said film system communication module;
a volume of water; a portion of said plurality of members of said film-making crew being generally under the surface of said volume of water;
said plurality of mobile transceivers including a first set of smartphones and a second set of underwater headsets; said second set of underwater headsets being configured to transmit and to receive ultrasonic signals through said volume of water;
said film communication module being configured to emit and to receive a ranging
signal for determining the position of one of said members of a film-making crew under water;
a back-end server; said back-end server including a processor and a memory; said back-end server being connected to said film system communication module; said back-end server for storing digital content concerning the production of a motion picture; said back-end server also for providing data and digital content to a remote requestor;
a software App; said software App being run on each of said first set of smartphones to provide a display showing some of said plurality of members of said film-making crew and their job functions;
said software App also for providing an interface for a director of said motion picture to receive data and communications, and to issue instructions to said members of said film-making crew.

2. An apparatus as recited in claim 1, in which said film system communication module is configured to communicate both audio and video signals.

3. An apparatus as recited in claim 1, in which said underwater headsets communicate using an ultrasonic frequency band.

4. An apparatus as recited in claim 1, in which said underwater headsets each include a sensor; said sensor for communicating position information to said system communication module.

5. An apparatus as recited in claim 1, in which said underwater headsets each include a microphone.

6. An apparatus as recited in claim 1, in which said underwater headsets each include a headphone.

7. An apparatus as recited in claim 1, in which said software App provides said plurality of members of said film-making crew with the ability to select a particular one of said plurality of members of said film-making crew for communications.

8. An apparatus as recited in claim 1, in which said software App enables said plurality of members of said film-making crew to select a sub-group of said-film making crew for communications.

9. An apparatus as recited in claim 1, in which
said software App generates a display of said plurality of said film-making crew together with their corresponding instructions for a particular scene in said motion picture.
10. An apparatus as recited in claim 1, further comprising:
a production management software program; said production management software program running on said back-end server.
11. An apparatus as recited in claim 10, in which
said software App enables specific instructions for a particular scene to be imported from said production management software running on said back-end server.
12. An apparatus as recited in claim 10, in which
a database; said database being stored in said memory of said back-end server;
said database for storing information specific to a particular motion picture production.
13. An apparatus as recited in claim 1, in which
said film system communication module uses the position data from said plurality of under water headsets to simulate a view of camera positions.
14. An apparatus as recited in claim 1, in which
said plurality of under water headsets are configured to guide said members of the film-making crew to positions under water.
15. An apparatus as recited in claim 1 in which
said headset includes a transmit module for transmitting voice. Said transmit module includes a hydrophone.

* * * * *